United States Patent
Utsumi et al.

[11] Patent Number: 6,088,189
[45] Date of Patent: Jul. 11, 2000

[54] CARTRIDGE ENTRY/EXIT STATION FOR A LIBRARY APPARATUS

[75] Inventors: Kenichi Utsumi; Toshihito Kanetsuku, both of Kawasaki; Takahisa Miyamoto, Inagi; Hiroshi Nakazawa, Inagi; Kazuhiko Kawase, Inagi; Osamu Ohmori, Kawasaki, all of Japan

[73] Assignee: Fujitsu Limited, Kawasaki, Japan

[21] Appl. No.: 09/022,862

[22] Filed: Feb. 12, 1998

[30] Foreign Application Priority Data

Feb. 28, 1997 [JP] Japan ................................. 9-046191

[51] Int. Cl.⁷ .......................... G11B 15/68; G11B 17/04
[52] U.S. Cl. ................................. 360/92; 369/178
[58] Field of Search ........................ 360/92; 369/178, 369/36, 37, 38

[56] References Cited

U.S. PATENT DOCUMENTS

| | | | |
|---|---|---|---|
| 4,807,066 | 2/1989 | Imazaike | 360/92 |
| 4,907,889 | 3/1990 | Simone | 360/92 |
| 5,128,816 | 7/1992 | Imazaike | 360/92 |
| 5,442,500 | 8/1995 | Hidano et al. | 360/92 |
| 5,449,229 | 9/1995 | Aschenbrenner et al. | 360/92 |
| 5,454,485 | 10/1995 | Dalziel | 360/92 |
| 5,781,517 | 7/1998 | Nakajima | 369/178 |

*Primary Examiner*—David Davis
*Attorney, Agent, or Firm*—Greer, Burns & Crain, Ltd.

[57] ABSTRACT

A cartridge access station in a library apparatus for providing safe loading/unloading of a cartridge while maintaining a simple and compact arrangement of the library apparatus. The cartridge access station includes an communication space for establishing direct communication and connection between an operating space for a transferring mechanism in the interior of a library apparatus and an external space of the library apparatus. A rack is provided in the communication space to guide the entry/exit of a cartridge from both sides of the operating space and the external space and to hold the cartridge within the communication space.

11 Claims, 23 Drawing Sheets

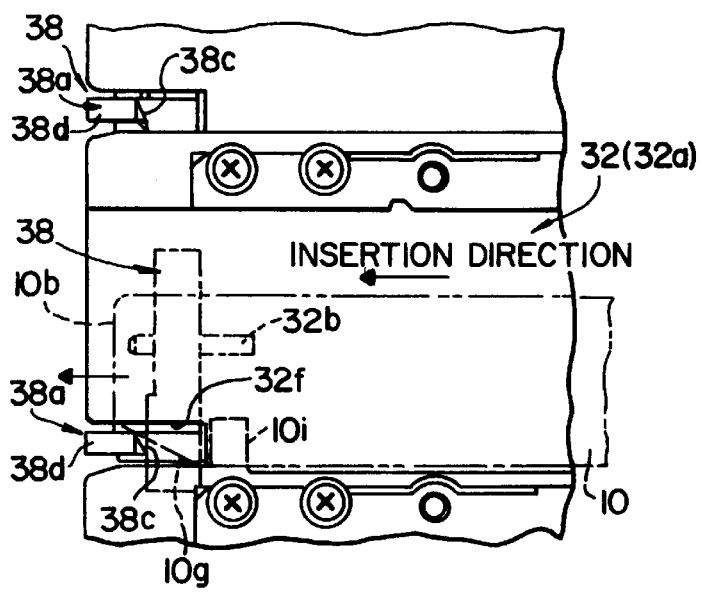
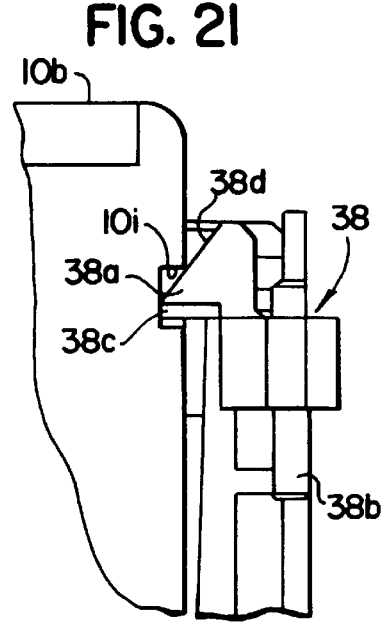
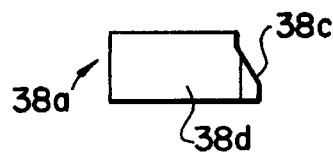
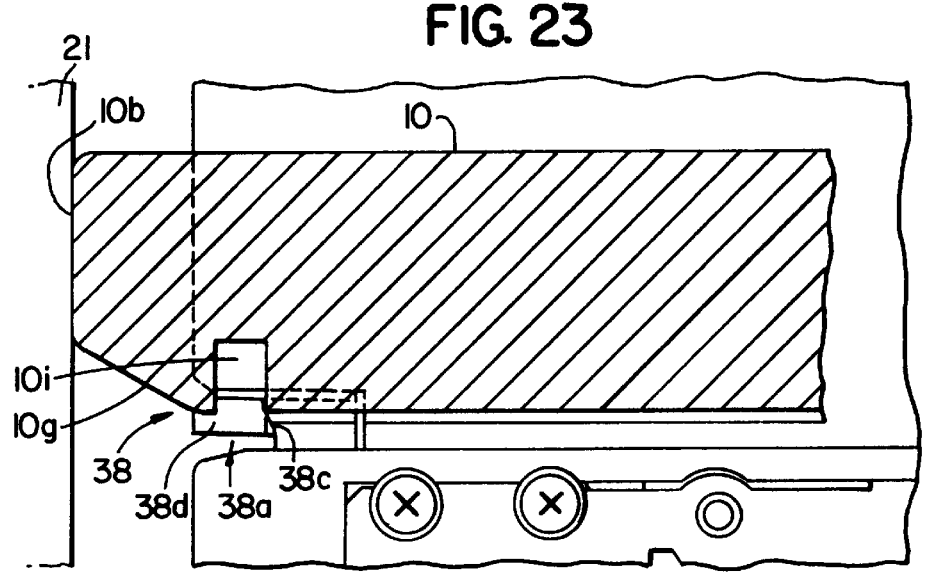

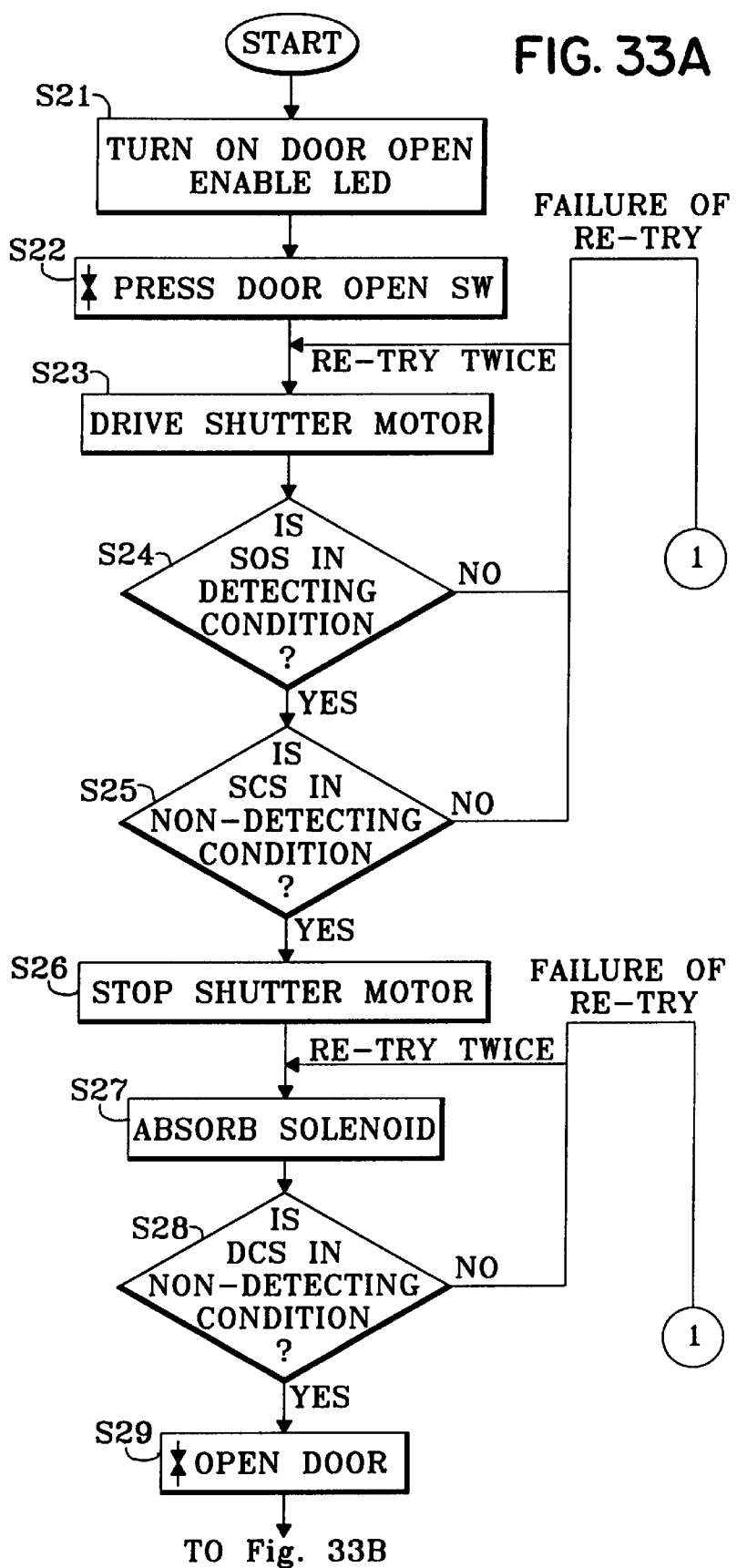

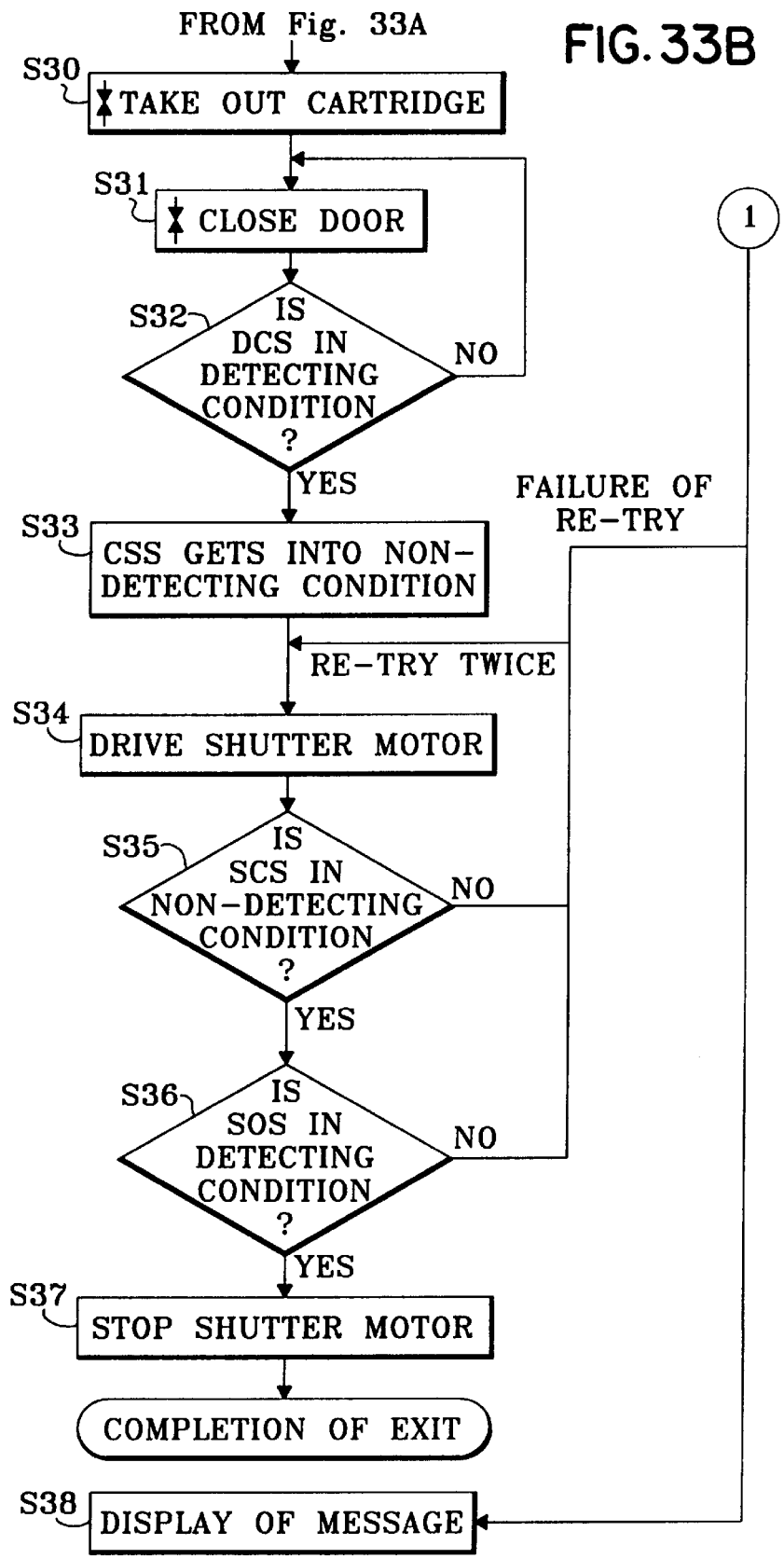

CARTRIDGE ENTRY/EXIT STATION FOR A LIBRARY APPARATUS

The present invention relates to a cartridge entry/exit station for use in a library apparatus which stores a number of cartridges such as magnetic tape cartridges and optical disc cartridges, and which transfers the cartridges to a drive unit through a transferring mechanism such as an accessor robot to process information recorded on a storage medium accommodated within the cartridge in the drive unit. The cartridge entry/exit station provides for entry of the cartridge into a library apparatus or the exit thereof toward the exterior of the library apparatus. More particularly, the invention further relates to a library apparatus equipped with a cartridge entry/exit station and having a communication space between an internal space for the transferring mechanism and an external space of the library apparatus.

BACKGROUND OF THE INVENTION

In general, a library apparatus such as a magnetic tape library apparatus includes a cartridge access unit having a cartridge entry/exit station (which will be referred hereinafter to as a CAS) for loading and unloading a cartridge accommodating a storage medium, e.g. a magnetic tape, a drive unit for performing recording/reproduction of data to and from the storage medium in the cartridge, and an accessor robot (hereinafter "accessor") for moving the cartridge between the access unit and the drive unit.

The CAS of the cartridge access unit includes a rack or shelf for accepting cartridges, and a drive mechanism for rotationally driving the rack so that a cartridge entry/exit portion (entry side) of the rack faces the exterior of the apparatus (the side where the operator operates the apparatus) or the interior of the apparatus (the space side where the accessor moves).

Accordingly, in order to facilitate entry of the cartridge, the rack is rotationally driven by the drive mechanism to expose the cartridge entry/exit portion of the rack to the exterior of the apparatus. After insertion of a cartridge into the rack by the operator, the rack is rotationally driven by the drive mechanism to face the entry/exit portion of the rack to the apparatus interior. Discharge of a cartridge is accomplished by a reverse process. Namely, the rack accepts a cartridge inserted by the accessor in a condition where the entry/exit portion of the rack faces the apparatus interior. Then, the rack is rotationally driven by the drive mechanism to expose the entry/exit portion to the apparatus exterior, allowing the operator to remove the cartridge.

However, in the case of the above-mentioned CAS of the library apparatus, entry/exit of the cartridge requires the cartridge rack to be reoriented by rotationally driving the cartridge rack. Accordingly, the drive mechanism and the rack of such a conventional apparatus must be configured for rotation. As a result, the conventional CAS structure increases the overall complexity and size of the library apparatus.

The present invention has been developed with a view to eliminating this problem. In particular, it is an object of this invention to provide a cartridge entry/exit station and a library apparatus which is capable of achieving the entry/exit of a cartridge while maintaining a simple and compact construction.

SUMMARY OF THE INVENTION

In keeping with one aspect of this invention, a cartridge entry/exit station (CAS) for a library apparatus includes a communication space defined to establish direct communication and connection between an operating space for the transferring mechanism in the interior of the library apparatus and an external space outside of the library apparatus. This is accomplished by locating the communication space adjacent to the operating space and the outside. Moreover, the communication space has no substantial mechanisms with moving parts, which would require a larger area for the communication space.

The direct communication of the operating space with the external space enables a cartridge inserted from the external space side of the apparatus to be taken by the transferring mechanism from the operating space side. As a result, the entry/exit of the cartridge can be accomplished with a relatively simple and compact configuration.

According to another aspect of the present invention, the cartridge entry/exit station includes a door for covering the rack from the external space side, a shutter for covering the rack from the operating space side, and a drive mechanism for driving the shutter into an open or closed condition. Moreover, the cartridge entry/exit station further includes a first shutter locking mechanism for inhibiting an opening operation of the shutter when the door is in an open condition and for allowing the opening operation thereof when the door is in a closed condition, and a door locking mechanism for inhibiting an opening operation of the door when the shutter is in an open condition and for allowing the opening operation thereof when the shutter is in a closed condition. The combination of the door and shutter enhance operator safety by preventing inappropriate attempts to insert or remove cartridges from the CAS.

According to another aspect of the invention, the rack is provided with an erroneous insertion preventing guide structure to prevent insertion of a cartridge in an erroneous direction. The guide structure has a guide surface which is brought into general contact with an outer circumference of the cartridge when the cartridge is inserted in a normal condition, thereby regulating the erroneous insertion of the cartridge.

Alternatively, the rack can be provided with an erroneous insertion preventing lever to prevent insertion of a cartridge in an erroneous direction. During normal insertion, the lever is pushed by the cartridge along a tapered surface formed on a front end side of the cartridge. However, when the cartridge is inserted in an erroneous insertion condition, the lever comes into contact with a front end surface of the cartridge, thereby controlling the erroneous insertion of the cartridge.

According to another aspect of the invention, the door is provided with an erroneous insertion preventing projection which, at a closure of the door, projects into a space formed by a chamfered portion of the cartridge, if the cartridge is inserted into the rack in a normal condition. In contrast, if the cartridge has been inserted improperly, the projection contacts the cartridge and inhibits the closure of the door.

According to another aspect, the rack is equipped with a positioning lever for determining whether a cartridge has been inserted improperly. The positioning lever has a tip portion protruding toward an insertion side of the cartridge. The positioning lever swings within a plane perpendicular to an insertion direction of the cartridge. During normal insertion of a cartridge from the external space side of the CAS, the positioning lever swings such that a tip portion thereof interacts with a positioning groove formed on a side portion of the cartridge to set an insertion location of the cartridge at the time that the positioning groove reaches a position of the positioning lever. The positioning lever and the cartridge positioning groove determine the insertion position of the cartridge, so that the cartridge can always be located within a constant allowable range with respect to the rack.

According to another aspect of the invention, the cartridge accommodates a magnetic tape as the storage medium and is equipped with a leader block for drawing out the magnetic tape in the processing section. The door includes a contact portion configured to contact and properly seat the leader block within the cartridge when the door of the CAS is placed in a closed condition. The contact portion may further be provided with a positioning mechanism for fixing a location of the contact portion with respect to the leader block on the basis of a frame structure of the rack when the door is in a closed condition.

Still further, the cartridge entry/exit station may include a shutter unit including the shutter and a mechanical unit fitted to the inside of the shutter unit. The mechanical unit is provided with the drive mechanism, the rack and the door, and is configured to be detachable from the shutter unit. Moreover, the cartridge entry/exit station may include a second shutter locking mechanism for inhibiting an opening operation of the shutter in a state where the mechanical unit is detached from the shutter unit and for allowing the shutter opening operation in a state of being attached thereto. The CAS may further include a mechanical unit locking mechanism for inhibiting a detaching operation of the mechanical unit from the shutter unit when the shutter is in an open condition and for allowing the mechanical unit to be detached from the shutter when in a closed condition. These features enhance operator safety by preventing inadvertent access by the operator to the operating space of the library apparatus unit.

Moreover, a library apparatus according to this invention stores a cartridge accommodating a storage medium and transfers the cartridge to a drive unit through a transferring mechanism so that a processing section of the drive unit processes the storage medium. The apparatus has a cartridge entry/exit station for performing loading and unloading of the cartridge, and includes the communication space located between the operating space for the transferring mechanism in the interior of the library apparatus and the external space of the library apparatus. A rack guides insertion/discharge of the cartridge from both sides of the operating space and the external space, and holds the cartridge within the communication space. A door is provided for covering the rack from the external space side, a shutter covers the rack from the operating space side, and a drive mechanism drives the shutter into a opening or closing condition. A shutter locking mechanism inhibits an opening operation of the shutter when the door is in an open condition and allows the shutter opening operation when in a closed condition, and a door locking mechanism inhibits an opening operation of the door when the shutter is in a open condition and allows the door opening operation when in a closed condition.

BRIEF DESCRIPTION OF THE DRAWINGS

A preferred embodiment of the present invention is described herein with reference to the drawings wherein:

FIG. 20 is an illustration viewed from the perspective of an arrow XX in FIG. 19;

FIG. 21 is a plan view showing an engaging condition (positioning condition) between a positioning lever and a positioning groove of a cartridge;

FIG. 22 is a side elevational view showing a tip portion of a positioning lever according to the present invention;

FIG. 23 is a side elevational view showing a state in which a front end portion of a cartridge runs on a tip portion of a positioning lever, for describing the operation of the positioning lever according to the present invention;

FIG. 33 is a flow chart describing an exit operation of a cartridge according to the present invention.

DETAILED DESCRIPTION

Figure 2:
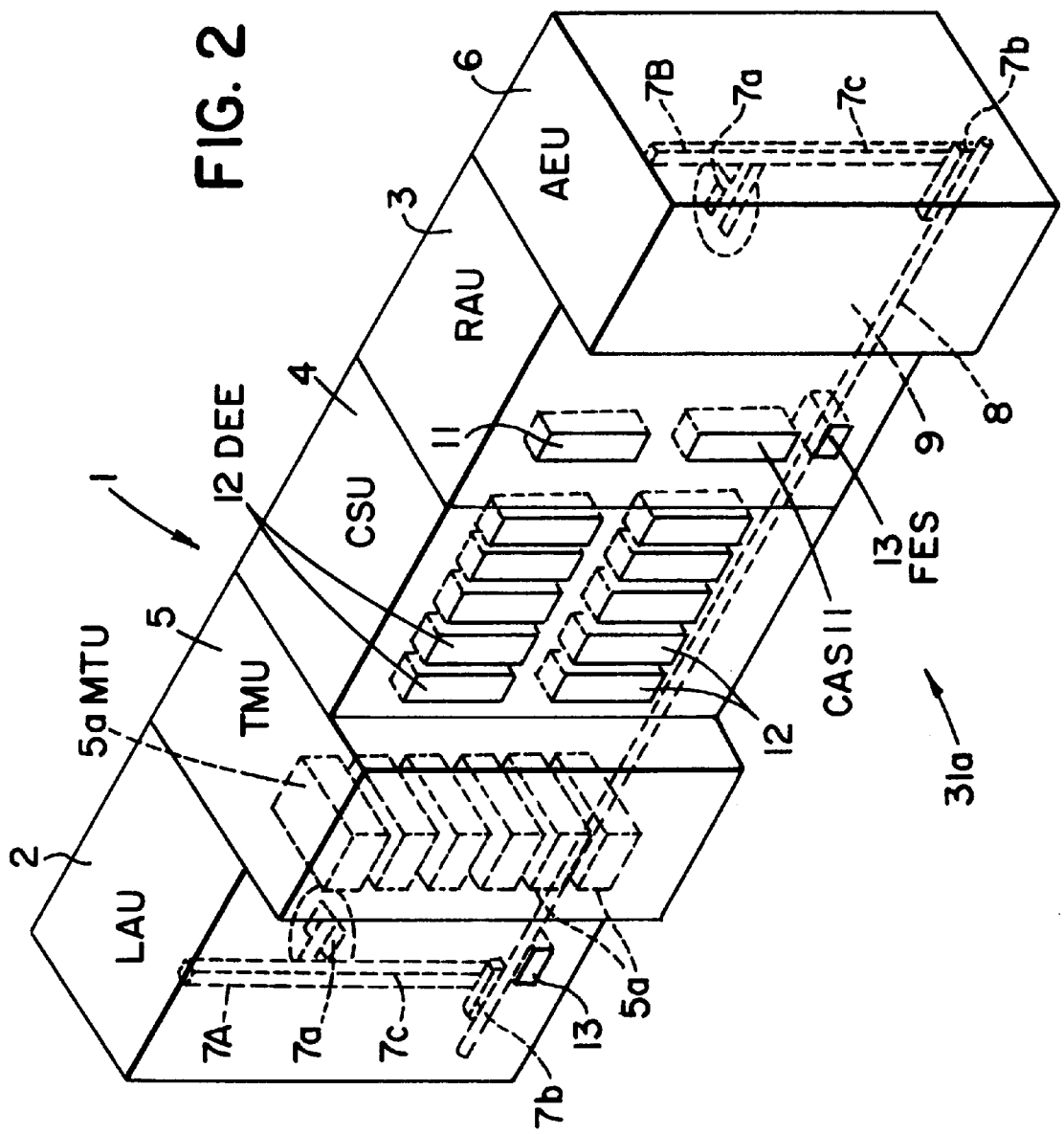
FIG. 2 is a perspective view illustratively showing the entire arrangement of the library apparatus of the present invention.

By manner of illustration, FIG. 2 is a perspective view showing the arrangement of a library apparatus according to the present invention. The library apparatus 1 stores a large number of storage medium cartridges 10 (see FIGS. 7 to 10), and performs recording/reproduction processing to/from each cartridge 10. The apparatus 1 includes left and right accessor units 2, 3 (LAU, RAU, respectively), a cartridge storage unit 4 (CSU), a drive unit or tape mount unit 5 (TMU), and an accessor extend unit 6 (AEU), which are operably connected to each other. Also included in the apparatus 1 are transferring mechanisms or accessor robots 7A, 7B (accessors) which are located on left and right sides and which transfer the cartridge 10 within the units 2 to 6.

The LAU 2 and RAU 3/AEU 6 function as garages for the accessors 7A, 7B, respectively. On the front side of the RAU 3 there are provided a pair of upper and lower cartridge entry/exit stations 11 (CAS) for carrying out the entry or exit of the cartridge 10 into or from the library apparatus 1 and a cartridge forced exit station (FES) 13 for forcibly discharging a defective cartridge from the library apparatus. In addition, another FES 13 is placed on the front side of the LAU 2.

According to one embodiment, the upper CAS 11 is used exclusively for the entry of cartridges while the lower CAS 11 is used exclusively for the exit of cartridges, though their respective structures are the same. The present invention particularly relates to the CAS 11, whose structure will be described later with reference to FIGS. 1 and 3 to 31.

The CSU 4 stores a large number of cartridges 10, and according to one embodiment includes five cartridge direct entry/exit stations 12 (DEE) on the upper side and five DEE's 12 on the lower side. In each DEE 12, a magazine (not shown) storing a plurality of cartridges 10 is placed, thereby facilitating the simultaneous entry or exit of the plurality of cartridges 10 into or from the library apparatus 1.

The TMU 5 has a plurality of processing sections 5a (six in FIG. 2) for performing the recording/reproduction of data onto/from the cartridge 10. According to one embodiment, the cartridge 10 is a magnetic tape cartridge, and the processing sections are magnetic tape drive units (MTU) 5a.

The AEU 6 includes a power source (not shown) for supply of an operating power to the accessor 7A or 7B and a controller (not shown) for control of the accessors 7A, 7B.

The respective units 2 to 6 are in a coupled relation to each other and placed in a state where their respective rear surfaces, i.e., the sides opposite to the above-mentioned front side, are brought into contact with a wall surface or the like and together constitute the library apparatus 1. Further, formed in the library apparatus 1 is an operating space 9 (accessor passage) for the accessors 7A, 7B which penetrates the units 2 to 6. The accessors 7A, 7B travel on a rail 8 on the bottom surface of the operating space 9. Each of the accessors 7A, 7B has a hand mechanism 7a for holding the cartridge 10, a carriage 7b for allowing each accessor 7A or 7B to horizontally move along the rail 8, and a vertical column 7c for vertically guiding the hand mechanism 7a on the carriage 7b.

In the library apparatus 1, the cartridge(s) 10 held in the CAS 11 or the DEE 12 are conveyed by the accessor 7A or 7B through the operating space 9 and inserted into the MTU 5a for processing.

In the MTU 5a, after the recording/reproduction processing on and from the magnetic tape housed in the cartridge 10, the cartridge 10 is gripped by the hand mechanism 7a of the accessor 7A or 7B and conveyed by the accessor 7A or 7B through the operating space 9 up to the CAS 11 or the DEE 12 and further placed at a given location (rack) of the CAS 11 or the DEE 12.

Cartridge Entry/Exit Station (CAS)

Figure 1:
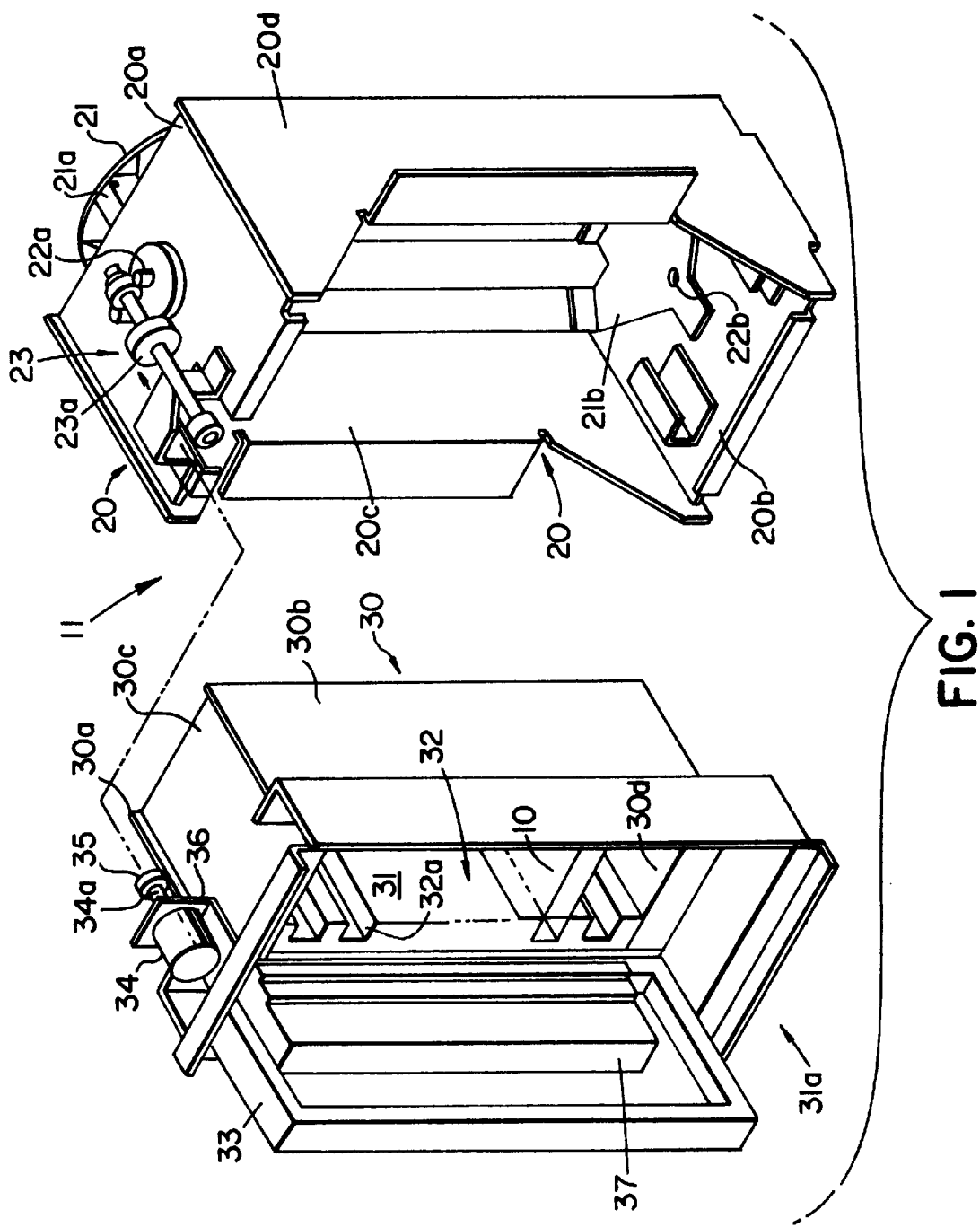
FIG. 1 is an exploded perspective view showing the basic structure of a cartridge entry/exit station in a library apparatus according to an embodiment of the present invention.

FIG. 1 is a exploded perspective view illustratively showing the basic arrangement of the CAS 11 in the library apparatus 1 according to one embodiment. As shown in FIG. 1, the CAS 11 according to this embodiment is broken into two sections: a shutter unit 20 and a mechanical unit 30. The mechanical unit 30 is detachably fitted to an inside portion of the shutter unit 20. Moreover, a communication space 31 is cooperatively defined by the mechanical unit 20 and the shutter unit 20 in a state where the mechanical unit 30 is fitted to the inside portion of the shutter unit 20. The communication space 31 is adjacent to both the operating space 9 (see FIG. 2) for the accessors 7A, 7B in the interior of the library apparatus 1 (LAU 2 or RAU 3) and an external space 31a outside of the library apparatus 1. In this manner, the communication space 31 establishes direct communication and connection between the operating space 9 and the outside space 31a.

A rack 32 is provided in the communication space 31 within the mechanical unit 30 for guiding the insertion/discharge of the magnetic tape cartridge 10 from both the operating space 9 and the external space. The rack 32 holds the cartridge 10 within the communication space 31. The rack 32 is provided with a plurality of guide grooves 32a situated in an opposed relation to each other. The plurality of guide grooves 32a are designed to guide the cartridges 10 by holding both left and right side portions of the cartridges 10 on the inner sides of right and left side boards 30a, 30b of the mechanical unit 30.

The communication space 31 does not have substantial mechanisms for the cartridges with moving parts which would increase the area needed for the communication space. The cartridges are moved in and out of the communication space 31, but are not moved or rotated within the space 31 as other cartridges are processed by the transferring mechanism.

Furthermore, the shutter unit 20 is equipped with a rotatable shutter 21 for covering the rack 32 (communication space 31) from the operating space 9 side. The shutter 21 is fitted to be rotatable about a vertical axis through upper and lower supporting plates 21a, 21b and upper and lower rotary shafts 22a, 22b. That is, the supporting plates 21a, 21b of the shutter 21 are rotatably supported on a top board 20a and bottom board 20b of the shutter unit 20 through the rotary shafts 22a, 22b, respectively.

Figure 4:
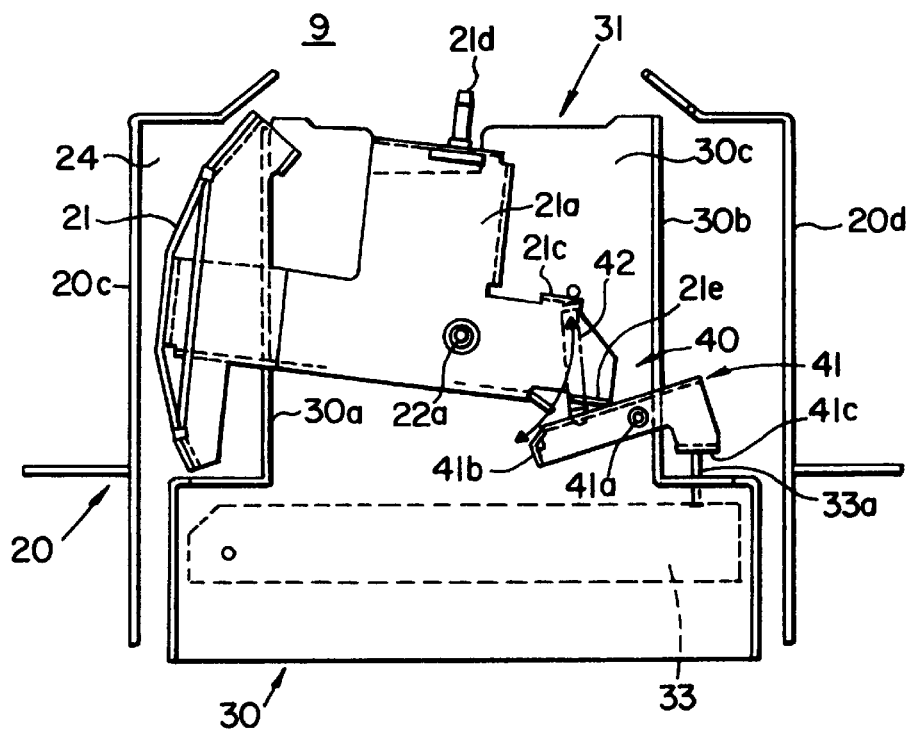
FIG. 4 is a plan view showing an unlocking condition of the first shutter locking mechanism according to the present invention.

By manner of illustration, FIG. 1 depicts the shutter 21 in a closed state where the shutter 21 covers communication space 31 from the operating space 9 side. Moreover, FIG. 4 shows the shutter 21 being rotationally driven counterclockwise (when viewed from above) and assuming a state in which the rack 32 (communication space 31) is exposed toward the operating space 9 side. In FIG. 1, reference numerals 20c and 20d represent right and left side boards of the shutter unit 20, respectively.

A gear mechanism 23 (FIG. 1) for rotationally driving the shutter 21 is provided on the top board 20a of the shutter unit 20. The gear mechanism 23 includes a plurality of gears, and is connected with the rotary shaft 22a. In addition, a drive motor also called a shutter motor 34 is attached through a fitting plate 36 to the mechanical unit 30.

Figure 3:
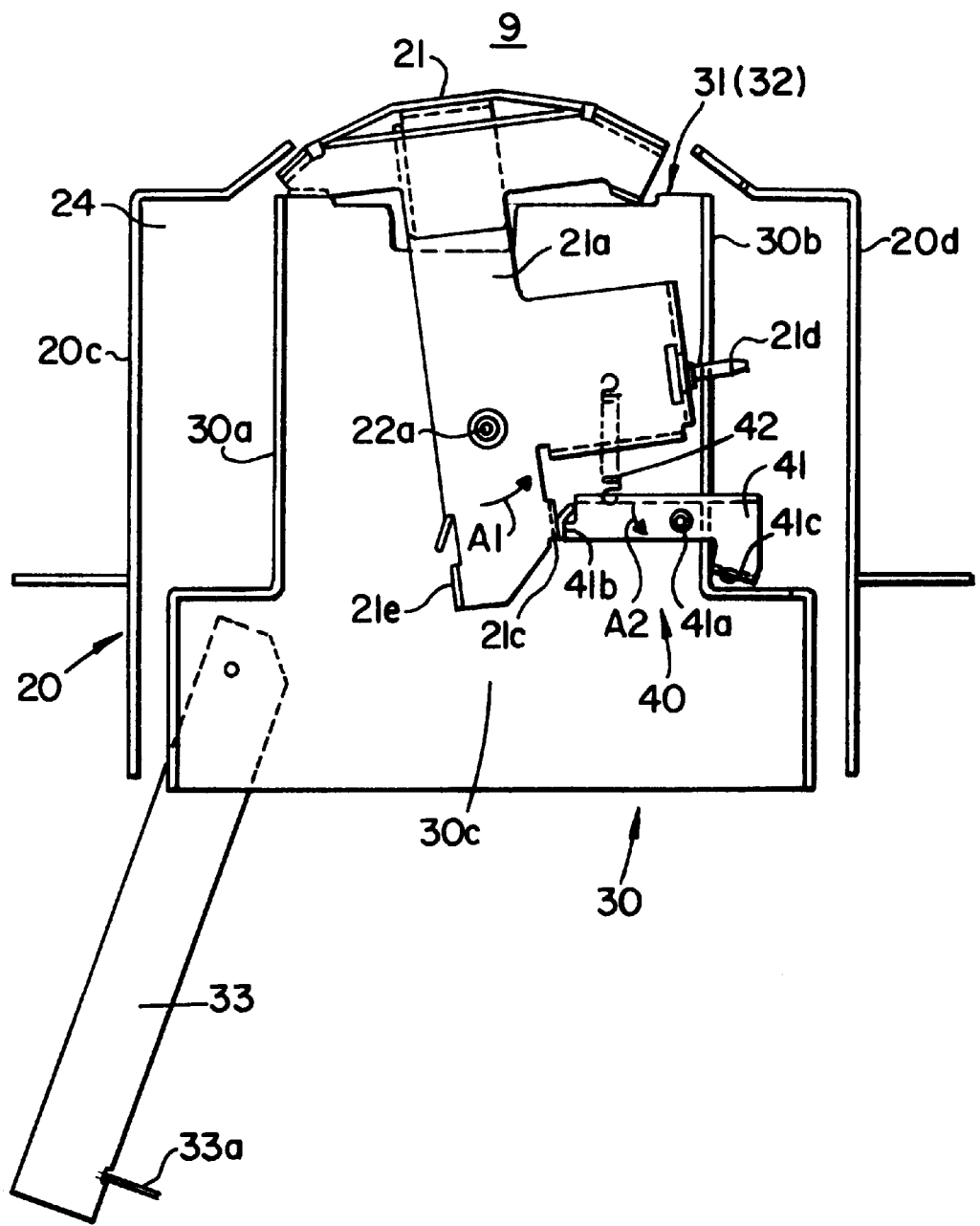
FIG. 3 is a plan view showing a locking state of a first shutter locking mechanism according to the present invention.

A gear 35 (FIG. 1) is fixedly fitted over a rotary drive shaft 34a of the drive motor 34. Moreover, FIG. 3 illustrates how the gear 35 engages with a gear 23a (of the gear mechanism 23) in a state where the shutter unit 20 and the mechanical unit 30 are fitted with each other to produce the CAS 11. The engagement of the gears 35 and 23a causes the rotational driving force from the drive motor 34 to be transferred through the rotary drive shaft 34a, the gear 35, the gear mechanism 23 and the rotary shaft 22a to the shutter 21. Accordingly, if the rotational drive of the shutter 21 is done in accordance with the switching of the rotating direction of the drive motor 34, the shutter 21 takes the opening or closing action.

The supporting plate 21a is provided between the top board 20a of the shutter unit 20 and a top board 30c of the mechanical unit 30, and the supporting plate 21b is provided between the bottom board 20b of the shutter unit 20 and a bottom board 30d of the mechanical unit 30. Further, FIGS. 3 and 4 show a shutter housing space 24 for housing the shutter 21 defined between the left side board 20c of the shutter unit 20 and the left side board 30a of the mechanical unit 30.

On the other hand, the mechanical unit 30 is provided with a door 33 which can cover the rack 32 (communication space 31) from the external space side. More specifically, the door 33 is rotatably supported at its left side portion, and is rotatable between an open state in which the communication space 31 is may be accessed from the outside of the library (FIG. 1), and a closed state as manipulated by the operator.

Furthermore, on the inner surface side of the door 33 there is fitted a pushing component 37 which comes into contact with an end surface of the cartridge 10 at the closure of the door 33 to push the cartridge 10 into the rack 32. As will be described later with reference to FIGS. 14 to 18, the pushing component 37 exercises a function (an erroneous insertion preventing projection 37a) to prevent the erroneous insertion of the cartridge 10 and fulfills an additional function (a leader block pushing contact portion 37b) to push a leader block 10a of the cartridge 10 therein.

Figure 24:
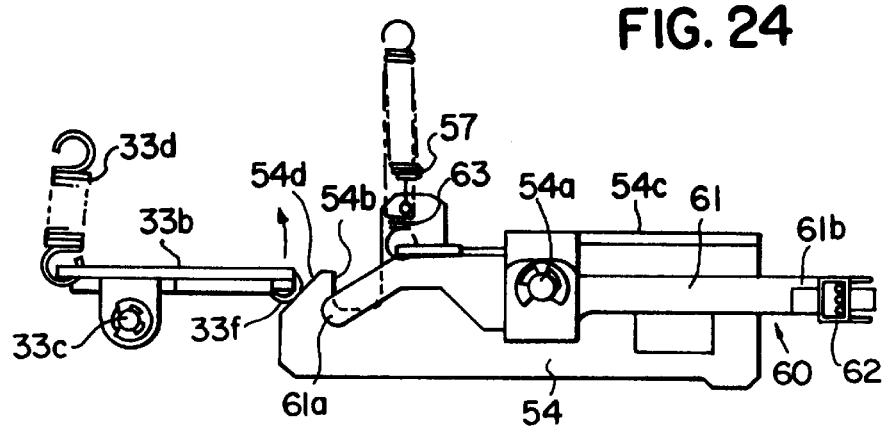
FIG. 24 is a side elevational view showing an arrangement and operation of a door closure detecting mechanism according to the present invention.
Figure 25:
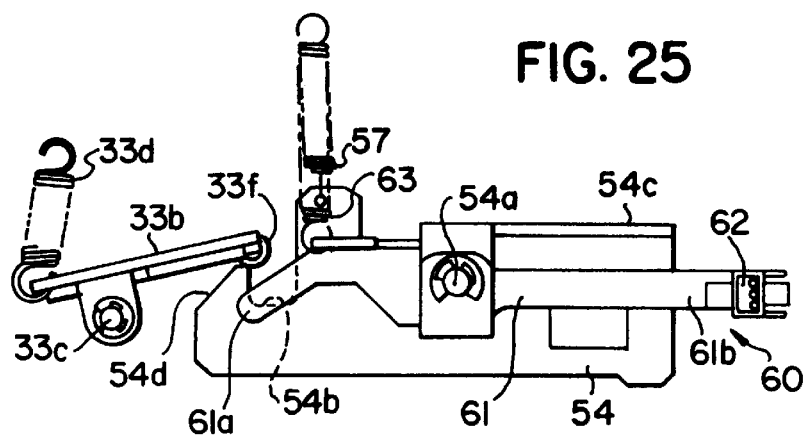
FIG. 25 is a side elevational view showing an arrangement and operation of a door closure detecting mechanism according to the present invention.
Figure 26:
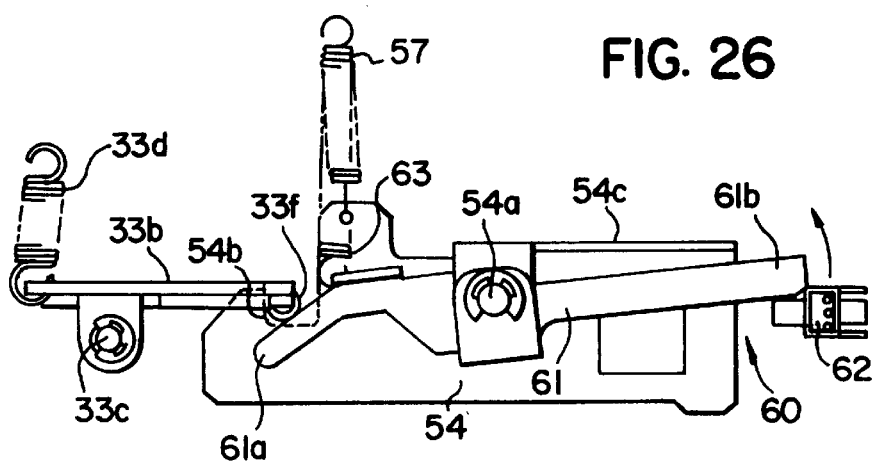
FIG. 26 is a side elevational view showing an arrangement and operation of a door closure detecting mechanism according to the present invention.

According to one embodiment, the mechanical unit 30 is equipped with various kinds of locking mechanisms and a door closure detecting mechanism 60 (see FIGS. 24 to 26). Moreover, the rack 32 in the mechanical unit 30 is provided with a structure for preventing the erroneous insertion of the cartridge 10 and a mechanism for setting the insertion location of the cartridge 10. In addition, the shutter unit 20 includes a second shutter locking mechanism 45 (see FIGS. 27 and 28).

As mentioned above, the CAS 11 of the present invention is configured to provide direct communication and connection between the operating space 9 in the library apparatus 1 and the external space 31a on the operator side. In particular, a cartridge 10 inserted from the external space side of the CAS 11 is taken from the operating space 9 side by the accessor 7A or 7B. Accordingly, the entry/exit of the cartridge 10 is achieved with a simple and compact construction. Moreover, to prevent operator injury, the shutter 21 is configured to be in a closed condition whenever the door 33 is in an open condition (for the entry/exit of the cartridge 10). This configuration ensures the safety of the operator by preventing the operator from inserting his hand or the like in the operating space (accessor passage) 9 in which the accessors 7A, 7B travel.

According to one aspect of the present invention, various mechanisms which are subject to maintenance, such as the drive motor 34 for opening and closing the shutter 21, electric parts such as detection mechanisms and locking mechanisms are provided on the mechanical unit 30 side. Thus, in the event of a break down, the mechanical unit 30 may readily be replaced independent of the shutter unit 20. Moreover, to ensure operator safety, the shutter 21 of the shutter unit 20 is maintained in the closed condition when the mechanical unit 30 is detached, thereby preventing the operator from inserting a hand or the like into the operating space (accessor passage) 9.

First Shutter Locking Mechanism And Door Locking Mechanism

As mentioned before, the CAS 11 of the present invention is provided with the shutter 21 for preventing inadvertent insertion of a hand or the like into the operating space 9 in a state where the door 33 is in the open condition. The CAS 11 is further equipped with a first shutter locking mechanism 40 (see FIGS. 3 and 4) which inhibits manual opening of the shutter 21 while the door 33 is in the open condition, and a door locking mechanism 50 (see FIGS. 5 and 6) for manually inhibiting opening the door 33 when the door 33 is in the closed condition and the shutter 21 is in the open condition. These locking mechanisms further ensure the safety of the operator.

Referring to FIGS. 3 to 6, a description will be made of the locking mechanisms 40 and 50.

FIGS. 3 and 4 are plan views showing the locking and unlocking states of the first shutter locking mechanism 40, respectively. In FIGS. 3 and 4, the top board 20a of the shutter unit 20, the drive motor 34, the gear mechanism 23 and several other components are omitted to clearly illustrate only the portions concerned with the first shutter locking mechanism 40.

The first shutter locking mechanism 40, as shown in FIGS. 3 and 4, acts to inhibit (lock) the opening operation of the shutter 21 when the door 33 is in the open condition and to allow (unlock) the opening operation when the door 33 is in the closed condition. The first shutter locking mechanism 40 includes a shutter locking contact portion 21c provided on the supporting plate 21a of the shutter 21, a shutter lock-releasing projection 33a attached onto the door 33, a shutter locking lever 41 attached to the top board 30c of the mechanical unit 30, and a spring 42.

The shutter locking contact portion 21c is interposed between the shutter 21 and the rotary shaft 22a, and is formed by bending a portion of the supporting plate 21a downwardly. Furthermore, the shutter locking lever 41 is provided on the top board 30c of the mechanical unit 30 to be rotatable within the generally same plane as the supporting plate 21a. At one end side portion of the lever 41 there is formed a shutter locking contact portion 41b which is made to come into contact with the shutter locking contact portion 21c of the supporting plate 21a. Moreover, a shutter lock-releasing contact portion 41c is formed at the other end side portion of the lever 41. The shutter lock-releasing contact portion 41c is configured to contact the shutter lock-releasing projection 33a attached to the door 33 when the door 33 is the closed condition.

The lever 41 is biased in a locking position shown in FIG. 3 by means of the spring 42 interposed between the lever 41 and the top board 30c of the mechanical unit 30. In the locking position, the contact portion 41b of the lever 41 contacts the contact portion 21c of the supporting plate 21a, thereby controlling the opening operation (the rotation in an arrow A1 direction) of the shutter 21.

Although FIGS. 3 and 4 only show the first shutter locking mechanism 40 located on the upper side of the shutter 21, the same mechanism is also provided between the supporting plate 21b on the lower side of the shutter 21 and the bottom board 30d of the mechanical unit 30 so that the shutter 21 can be locked/unlocked at the both upper and lower portions. For this reason, a shutter lock-releasing projection 33a is also mounted on the lower side of the door 33. In FIGS. 3 and 4, reference numeral 21e designates a shutter locking contact portion for a second shutter locking mechanism 45 (see FIGS. 27 and 28). Further, numeral 21d denotes a door locking/unlocking pin made to protrude from the supporting plate 21a, which is part of the door locking mechanism 50 (see FIGS. 5 and 6).

In accordance with the above-described composition, when the door 33 is in the open condition and the communication space 31 (rack 32) is closed from the operating space 9 side by the shutter 21, the lever 41 (FIG. 3) receives a biasing force from the spring 42. The biasing force places the lever 41 in a locking position. At this locking position, the contact portion 41b of the lever 41 and the contact portion 21c of the supporting plate 21a come into contact with each other to lock the shutter 21, thereby inhibiting the opening operation (the rotation in the arrow A1 direction) of the shutter 21.

Furthermore, in response to the closure of the door 33, the projection 33a of the door 33 contacts and presses the contact portion 41c of the lever 41 to rotate the lever 41 (in a direction shown by arrow A2 in FIG. 3) against the biasing force of the spring 42, so that the lever 41 is located at the unlocking position shown in FIG. 4. At this unlocking position, the contact portion 41b of the lever 41 retreats from the rotating area of the contact portion 21c of the supporting plate 21a, thereby releasing the contact portion 21c and the contact portion 41b from interference. In this state, the shutter 21 is unlocked (and can rotate in the direction shown by arrow A1 in FIG. 3) and can assume the opening operation shown in FIG. 4.

Figure 5:
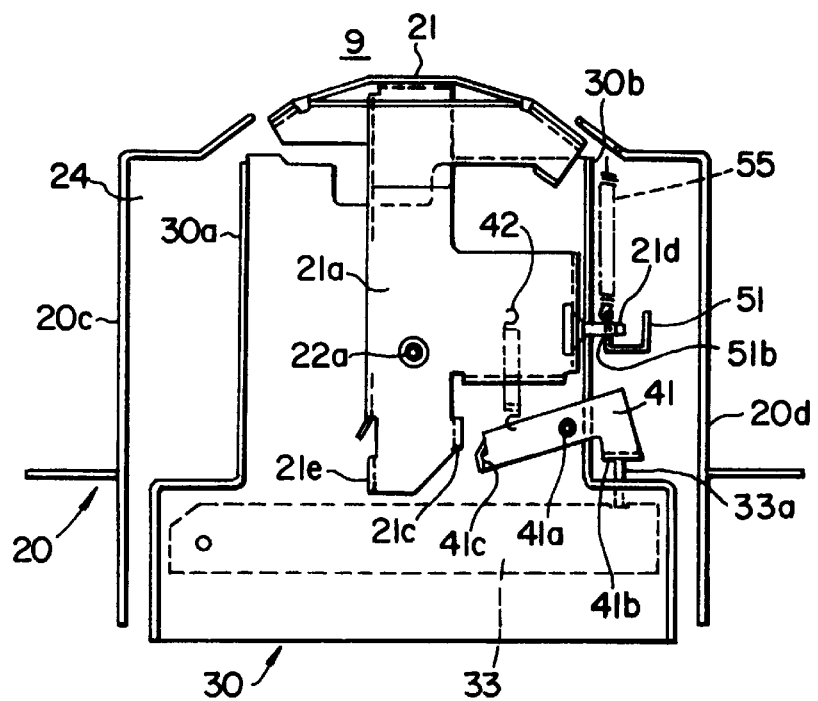
FIG. 5 is a plan view showing a locking state of a door locking mechanism according to the present invention.
Figure 6:
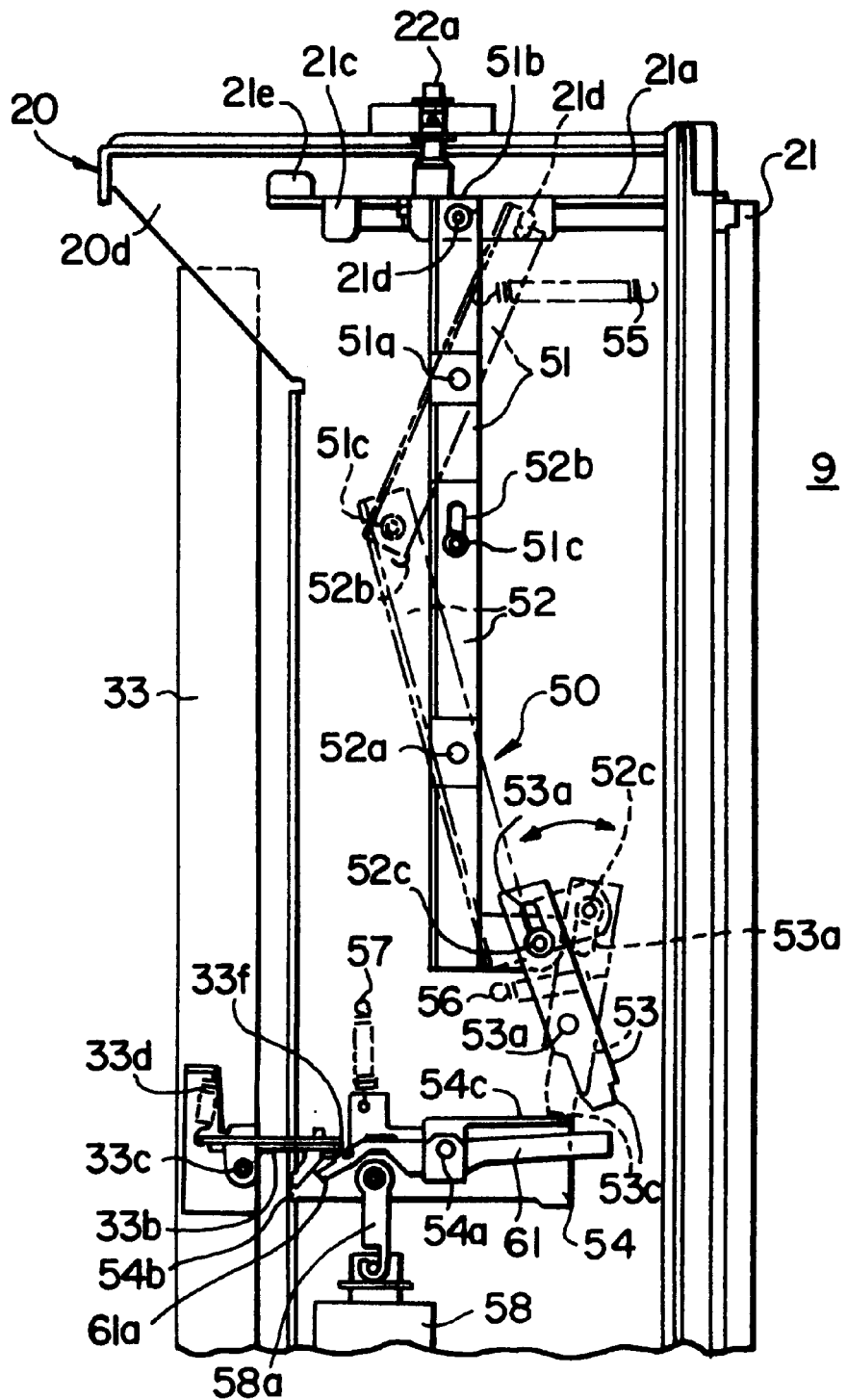
FIG. 6 is a side elevational view showing locking and unlocking conditions of the door locking mechanism according to the present invention.

FIGS. 5 and 6 are illustrations of the door locking mechanism 50, FIG. 5 being a plan view showing its locking state and FIG. 6 being a side elevational view showing the locking state and its unlocking state. In FIG. 6, the unlocking state is indicated by a solid line while the locking state is indicated by a two-dot chain line. Further, FIG. 5 includes the illustration of only the portions relating to the door locking mechanism 50 but not including the illustrations of the top board 20a of the shutter unit 20, the drive motor 34 and the gear mechanism 23. In FIG. 6, the door locking mechanism 50 placed between the side board 20d of the shutter unit 20 and the side board 30b of the mechanical unit 30 is shown in perspective from the side board 20d side of the shutter unit 20.

As shown in FIGS. 5 and 6, the door locking mechanism 50 is made to inhibit (lock) the opening operation of the door 33 when the shutter 21 is in the open condition and to allow (unlock) it to open when the shutter 21 in the closed condition. The door locking mechanism 50 includes a door locking/unlocking pin 21d protruding from the supporting plate 21a, a locking member 33b on the door 33, link members 51, 52 attached to the outside of the side board 30b, door locking levers 53, 54, and springs 55, 56, 57.

The door locking/unlocking pin 21d, as shown in FIG. 5, is made to protrude from the supporting plate 21a in a direction perpendicular to the side board 30b of the mechanical unit 30 and toward outside the side board 30b when the shutter 21 is in the closed condition.

Furthermore, as shown in FIG. 6, the locking member 33b is attached onto the inner surface of the door 33 in a state where its proximal side portion is rotatably supported by the rotary shaft 33c. The locking member 33b is engaged with (hooked by) a hook portion 54b of the door locking lever 54 from below when the door 33 is in a closed condition, and has a U-like configuration when viewed from above. In addition, the locking member 33b is biased by a spring 33d so that its tip portion turns downwardly. The locking member 33b is located on the right-hand side when viewed from the front side of the door 33 and at a position approximately corresponding to half the height of the door 33. Further, a roller 33f is rotatably fitted to the tip side portion of the locking member 33b of the door 33 to be engaged with the hook portion 54b.

As shown in FIG. 6, the door locking lever 54 is attached to the side board 30b of the mechanical unit 30 in a state where its central portion is rotatably supported by a rotary shaft 54a. On one end side of the lever 54 there is formed the hook portion 54b which is designed to lock the door 33 side locking member 33b from below when the door 33 is in the closed condition. Further, the lever 54 is biased by the spring 57 to turn the hook portion 54b upwardly. On the other end side of the lever 54 there is formed a contact portion 54c which comes into contact with a contact portion 53c of the door locking lever 53 in the door locked condition.

Furthermore, a door opening solenoid 58 is connected through a connecting member 58a to the lever 54. The solenoid 58 is excited in response to the operator pressing a door opening switch, as will be described later with reference to FIGS. 32 and 33. With the excitation of the solenoid 58, the connecting member 58a is attracted downwardly and the lever 54 is rotated so that its hook portion 54b side comes down through the connecting member 58a. Then, the door 33 side locking member 33b and the hook portion 54b of the lever 54 are released from the locking state to permit the door 33 to open.

Still further, a link mechanism including link members 51, 52 and the door locking lever 53 is provided between the door locking lever 54 and the door locking/unlocking pin 21d of the supporting plate 21a. These link members 51, 52 and the lever 53 are rotatably supported at their central portions by rotary shafts 51a, 52a and 53a and attached onto the side board 30b of the mechanical unit 30.

The link member 51 is biased in the locking direction by the spring 55 (the locking position is indicated by the two-dot chain line in FIG. 6). In addition, a pin engaging recess portion 51b is formed on the upper end portion of the link member 51. The recess portion 51b and the door locking/unlocking pin 21d are brought into a fully engaged condition when the shutter 21 is in the closed condition (indicated by a solid line in FIG. 6). The link member 51 takes the vertical unlocking position while resisting the biasing force of the spring 55. On the other hand, when the shutter 21 is in the open condition, as indicated by the two-dot chain line in FIG. 6, the pin 21d moves to the operating space 9 side (the right side in FIG. 6). In connection with the rotation of the shutter 21, the link member 51 receives a biasing force from the spring 55 causing the link member 51 to rotate clockwise slightly, moving the member from the unlocked position to the locked position, and causing the supporting plate 21a to be released from the engaging condition with the recess portion 51b.

The lower end side portion of the link member 51 is connected through a connecting pin 51c to the upper end side of the link member 52. The upper end side portion of the link member 52 has an elongated hole 52b, and the link member 51 side connecting pin 51c penetrates and is moveable within the elongated hole 52b. Further, the link member 52 has an L-like configuration and is connected at its lower end side tip portion, through a connecting pin 52c, to the upper end side of the door locking lever 53. The upper end side portion of the lever 53 has an elongated hole 53b, and the link member 52 side connecting pin 52c penetrates and is moveable along the elongated hole 53b.

The lever 53 is biased in the unlocking direction by the spring 56 (unlocking position indicated by the two-dot chain line in FIG. 6). Further, a contact portion 53c is formed on a lower end portion of the lever 53. The contact portion 53c comes into contact with the contact portion 54c of the door locking lever 54 from above when the door 33 is in the locked condition.

In cases where the shutter 21 is closed and the link member 51 is at the above-mentioned unlocking position (indicated by the solid line in FIG. 6), the link members 51, 52 are vertically arranged in a straight line, and the connecting pins 51a, 52a contact the lower side portions of the elongated holes 52b, 53b, respectively. Accordingly, the contact portion 53a of the lever 53 separates from above the contact portion 54a of the lever 54 and the door locking mechanism 50 gets into the unlocking state which allows the rotation of the lever 54 (the opening operation of the door 33).

On the other hand, when the shutter 21 is opened and the link member 51 is at the above-mentioned locking position (indicated by the two-dot chain line in FIG. 6), the connecting pins 51a, 52a contact the upper side portions of the elongated holes 52b, 53b, respectively. Moreover, the link member 52 shifts, by slight counterclockwise rotation, from the unlocking position to the locking position. Similarly, the lever 53 shifts, by slight clockwise rotation, from the unlocking position to the locking position while resisting the biasing force of the spring 56. Consequently, the contact portion 53a of the lever 53 is located above the contact portion 54a of the lever 54 and the door locking mechanism 50 comes into the locking state that inhibits the rotation of the lever 54 (the opening operation of the door 33). In this locking state, the contact portion 53a of the lever 53 and the contact portion 54a of the lever 54 interfere with each other to restrict the rotation of the lever 54, which does not allow the detachment of the locking member 33b of the door 33 from the hook portion 54b of the lever 54, thereby preventing the opening of the door 33.

In FIG. 6, reference numeral 61 depicts a sensor flag placed in parallel to the lever 54 and rotatably supported on the side board 30b of the mechanical unit 30 by the same rotary shaft 54a. Moreover, the sensor flag 61 constitutes the door closure detecting mechanism 60 (see FIGS. 24 to 26). According to this arrangement, when the shutter 21 takes the open state after the closed condition of the door 33 (indicated by the two-dot chain line in FIG. 6), the link members 51, 52 and the lever 53 are at the aforesaid locking positions, and the contact portion 53a of the lever 53 and the contact portion 54a of the lever 54 interfere with each other to limit the rotation of the lever 54. For this reason, even if the solenoid 58 operates in error, allowing the rotation of the lever 54 or if a person tries to manually open the door 33, the locking member 33b of the door 33 prevents the detachment from the hook portion 54b of the lever 54, thereby making it impossible to open the door 33.

Furthermore, in response to the closure of the shutter 21 (indicated by the solid line in FIG. 6), the pin 21d of the supporting plate 21a engages the recess portion 51b at the upper end portion of the link member 51, and the link members 51, 52 and the lever 53 come to the above-mentioned unlocking positions, so that the contact portion 53a of the lever 53 separates from above the contact portion 54a of the lever 54, thereby allowing the rotation of the lever 54 to open the door 33.

As described above, the first shutter locking mechanism 40 inhibits the opening operation of the shutter 21 when the door 33 is in the open condition while the door locking mechanism 50 inhibits the opening operation of the door 33 when the shutter 21 is in the open condition, and hence it is possible to more assuredly prevent the operator from inserting a hand or the like into the operating space 9, when the accessors 7A, 7B move, thereby enhancing the security of the operator. In addition, the above-mentioned locking/unlocking functions are easily realizable with a mechanical means linked with the operation of the door 33 or the shutter 21, and further the locking mechanisms 40, 50 do not require a special area, thus saving space.

The rotary shutter 21 could also be locked, for example, by an electrical locking method, and a method of locking a gear (a portion of the gear mechanism 23) connected with the shutter 21 by a latch interlocked with the door 33. Nonetheless, the shutter locking mechanism 40 according to this embodiment, which locks the shutter 21 by the lever 41 working with the opening operation of the door 33 is preferable.

Erroneous Cartridge Insertion Preventing Structure And Structure for Pushing The Leader Block When the operator puts the magnetic tape cartridge 10 in the rack 32 of the CAS 11, it is necessary to ensure proper orientation of a cartridge 10 in order to assure that the accessors 7A, 7B may correctly handle the cartridge 10. The accessors 7A, 7B can not put the cartridge 10 into the MTU 5a unless the front surface of the cartridge 10 is oriented as shown in FIGS. 7 to 10. Accordingly, when the cartridge 10 is set on the rack 32 of the CAS 11, it is necessary that the cartridge 10 be located so that its front surface 10b side is oriented towards the operating space 9 side and its upper surface 10j (see FIGS. 7 and 8) is turned upwardly.

If the cartridge 10 is inserted in a position other than this position, the correct handling of the cartridge within the library apparatus 1 becomes difficult. Therefore, according to one aspect of the present invention, the insertion of the cartridge 10 into the rack 32 from the external space side is regulated on the basis of the configuration of the cartridge 10, to prevent the erroneous insertion of the cartridge 10. That is, an erroneous insertion preventing guide structure 32b and an erroneous insertion preventing lever 32c are provided in each of the guide grooves 32a of the rack 32 (see FIGS. 11 to 13), and an erroneous insertion preventing projection 37a is formed on the door 33 (see FIGS. 14 to 18).

In addition, in the case of the cartridge 10 of this embodiment, as shown in FIGS. 7 to 10, a leader block 10a for drawing out a magnetic tape housed in the MTU 5a is attached to the tip portion of the magnetic tape. The leader block 10a is encased in the housing of the cartridge 10 and locked therein. The leader block 10a is withdrawn from the cartridge into the MTU 5a to pull out the magnetic tape from the interior of the cartridge 10. However, if the leader block is improperly seated (engaged) with a cartridge (see, e.g. FIG. 10), processing cannot be conducted for that cartridge 10. For this reason, a contact portion 37b (see FIGS. 14 to 18) for pushing the leader block 10a into the cartridge 10 is provided on the door 33. As will be described later, the contact portion 37b is formed integrally with the erroneous insertion preventing projection 37a and is fitted as a pushing component 37 to the door 33.

First, a detailed description will be made of the structure of the cartridge 10, with reference to FIGS. 7 to 10. Then a description will be made of the erroneous insertion preventing guide structure 32b and the erroneous insertion preventing lever 32c, with reference to FIGS. 11 to 13. Subsequently, a description will be made of the erroneous insertion preventing projection 37a and the leader block pushing contact portion 37b (pushing component 37), with reference to FIGS. 14 to 18.

Figure 7:
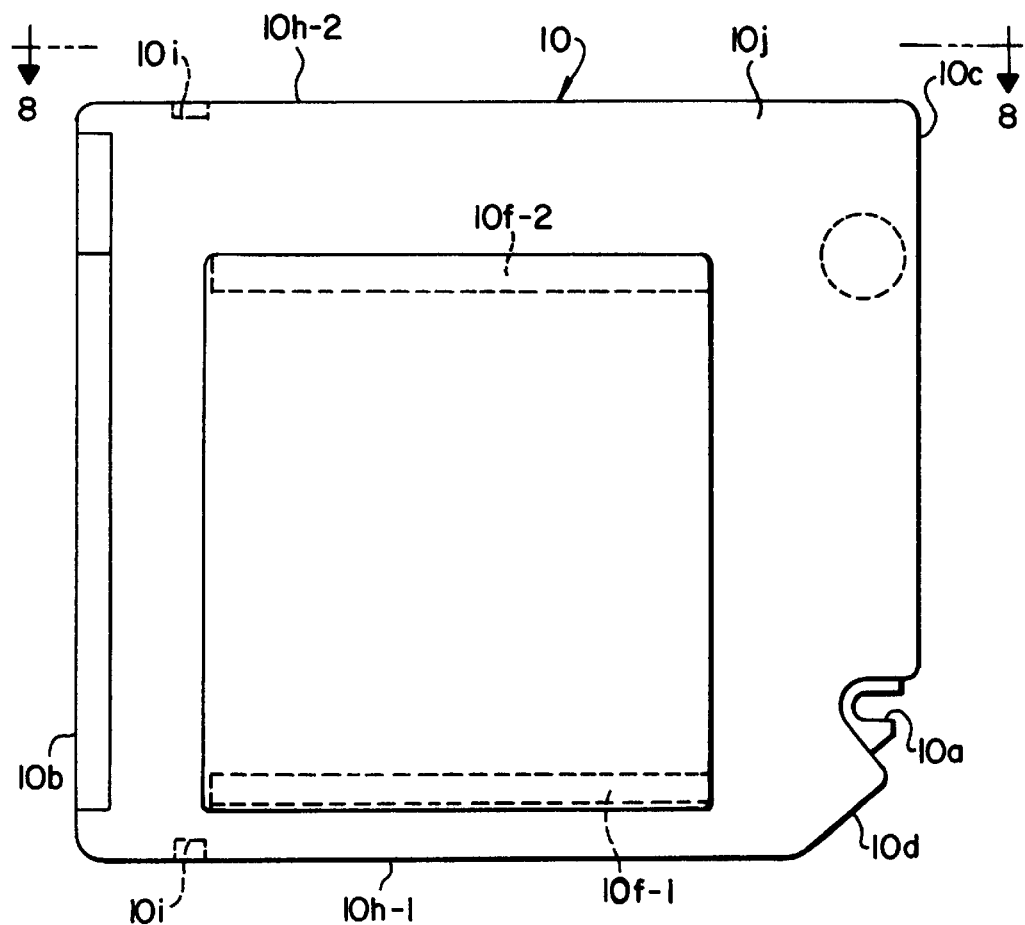
FIG. 7 is a plan view showing a magnetic tape cartridge according to the present invention.
Figure 8:
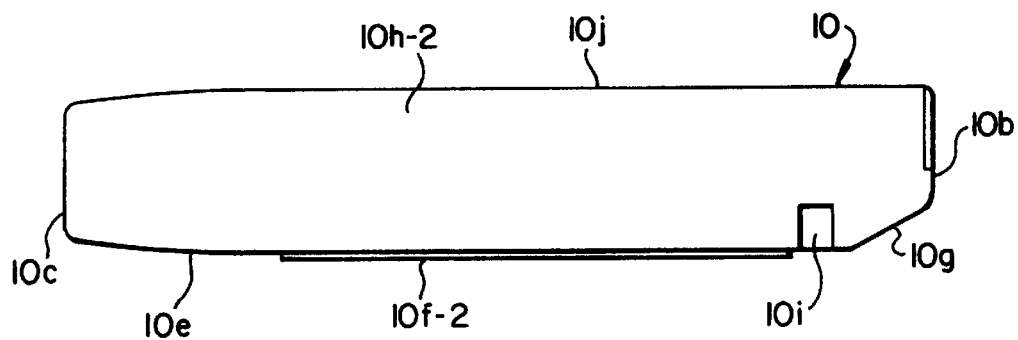
FIG. 8 is an illustration viewed from the perspective of an arrow VIII in FIG. 7.
Figure 9:
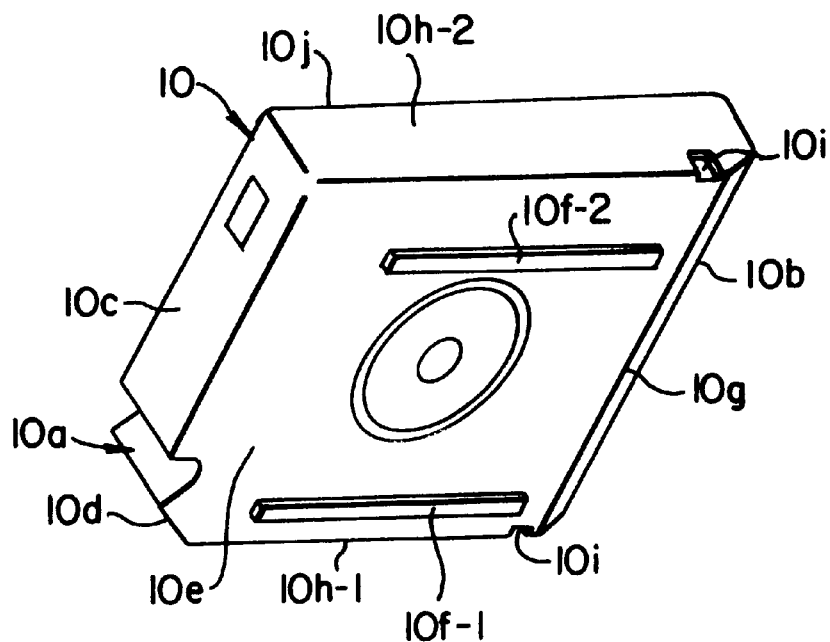
FIG. 9 is a perspective view showing a magnetic tape cartridge viewed from a bottom surface in the present invention.
Figure 10:
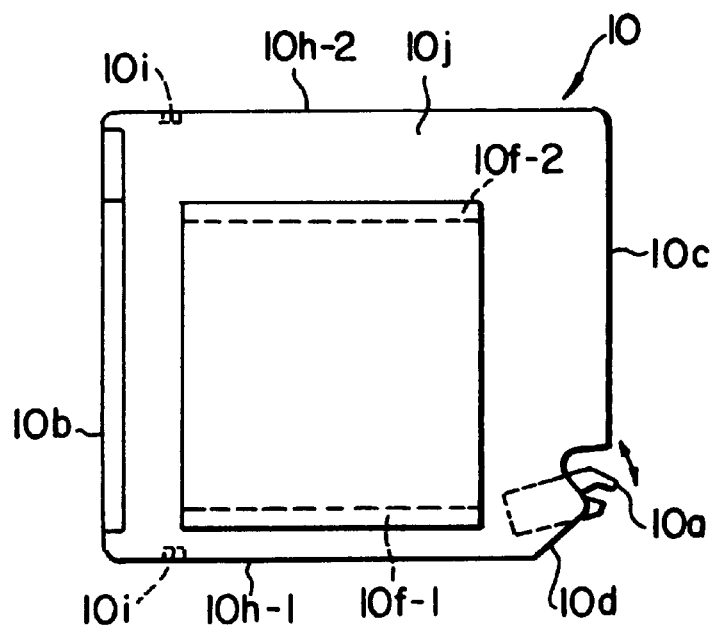
FIG. 10 is a plan view showing a magnetic tape cartridge where a leader block is out of place.

FIGS. 7 to 10 show a magnetic tape cartridge 10 used in conjunction with one embodiment of the present invention. In these illustrations, FIG. 7 is a plan view thereof, FIG. 8 is an illustration viewed from the direction of an arrow VIII in FIG. 7, FIG. 9 is a perspective illustration viewed from its bottom side, and FIG. 10 is a plan view showing the magnetic tape cartridge where the leader block 10a is in a disconnected condition.

In this embodiment, the magnetic tape cartridge 10 is, for example, of the I3480 type, and as shown in FIGS. 7 to 10, when the cartridge 10 is put in the rack 32 of the CAS 11, the front surface 10b of the cartridge 10 is oriented towards the front end side in the insertion direction.

A chamfered portion 10d for housing the leader block 10a is formed between a rear surface 10c of the cartridge 10 and a left-hand side surface 10h-1 as one faces the rear surface 10c. Further, two projections 10f-1, 10f-2 are shaped on a bottom surface 10e of the cartridge 10, parallel to the insertion direction of the cartridge 10.

These projections 10f-1, 10f-2 are located so that the separation between the right-hand projection 10f-2 and a right-hand side surface 10h-2 is larger than the separation between the left-hand projection 10f-1 and a left-hand side surface 10h-1.

The cartridge 10 is provided with tapered surface 10g shaped between the front surface 10c and bottom surface 10e of the cartridge 10. Further, positioning grooves 10i for accepting tip portions 38a of a positioning lever 38 (see FIGS. 19 to 23) are formed on the front end side (near the tapered surface 10g) of the right- and left-hand side surfaces 10h-1, 10h-2 of the cartridge 10, and extend from the right- and left-hand side surfaces 10h-1, 10h-2 to the bottom surface 10e. The effect of the positioning grooves 10i will be described below.

In FIGS. 7 to 10, reference numeral 10j designates a top surface of the cartridge 10. Further, as shown in FIG. 10, the leader block 10a is rotated about one rotational supporting point and is housed and locked through the use of its configuration and the elasticity of the case of the cartridge 10.

Figure 11:
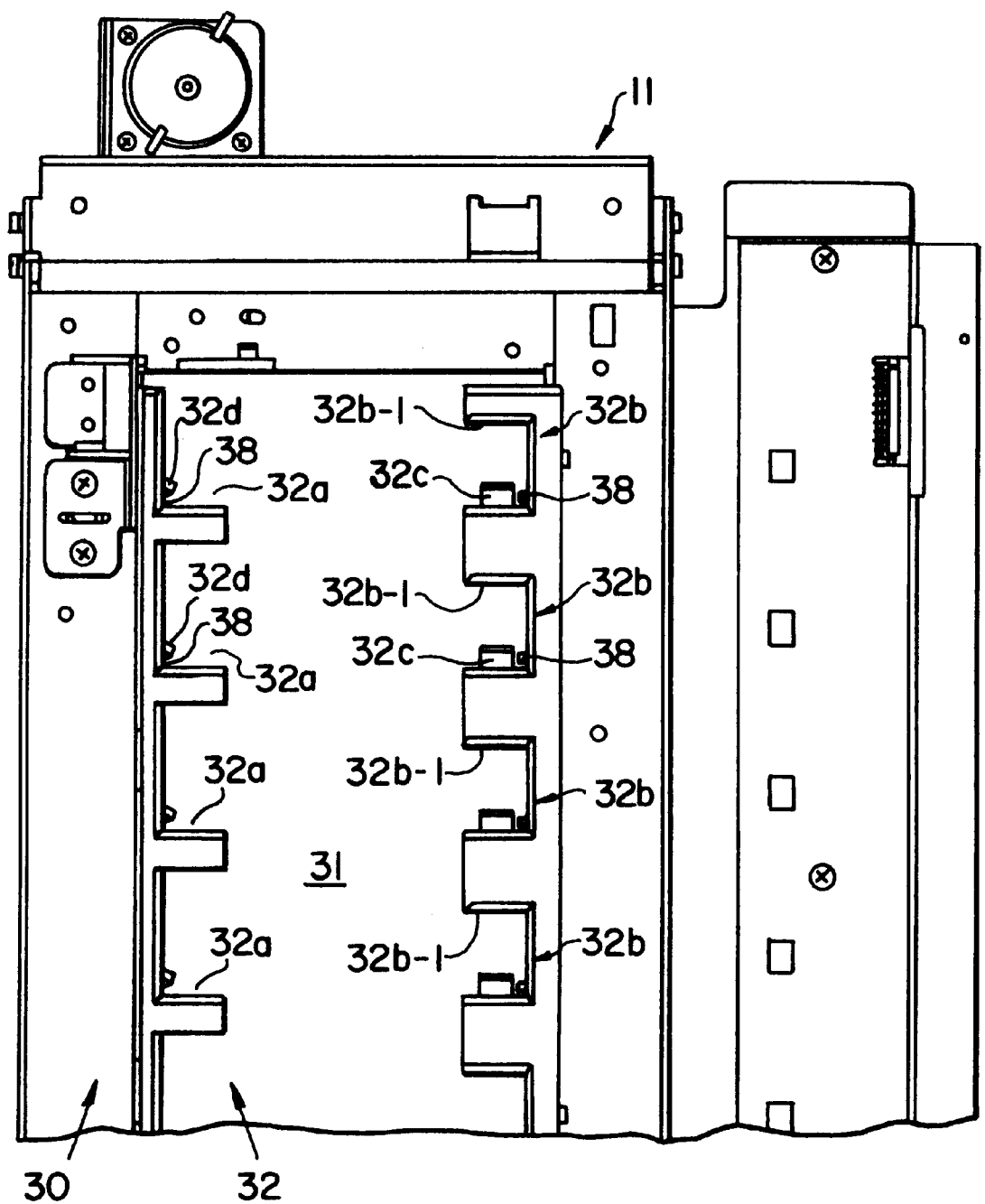
FIG. 11 is a front elevational view showing a rack including an erroneous insertion preventing guide structure and an erroneous insertion preventing lever according to the present invention.

FIG. 11 is a front elevational view showing the rack 32 having the erroneous insertion preventing guide structure 32b and the erroneous insertion preventing lever 32c according to this embodiment. Moreover, FIG. 12 is a front elevational view showing a principal portion of the rack 32, and FIG. 13 is a side elevational view showing the rack 32 equipped with the erroneous insertion preventing guide structure 32b and erroneous insertion preventing lever 32c.

Figure 12:
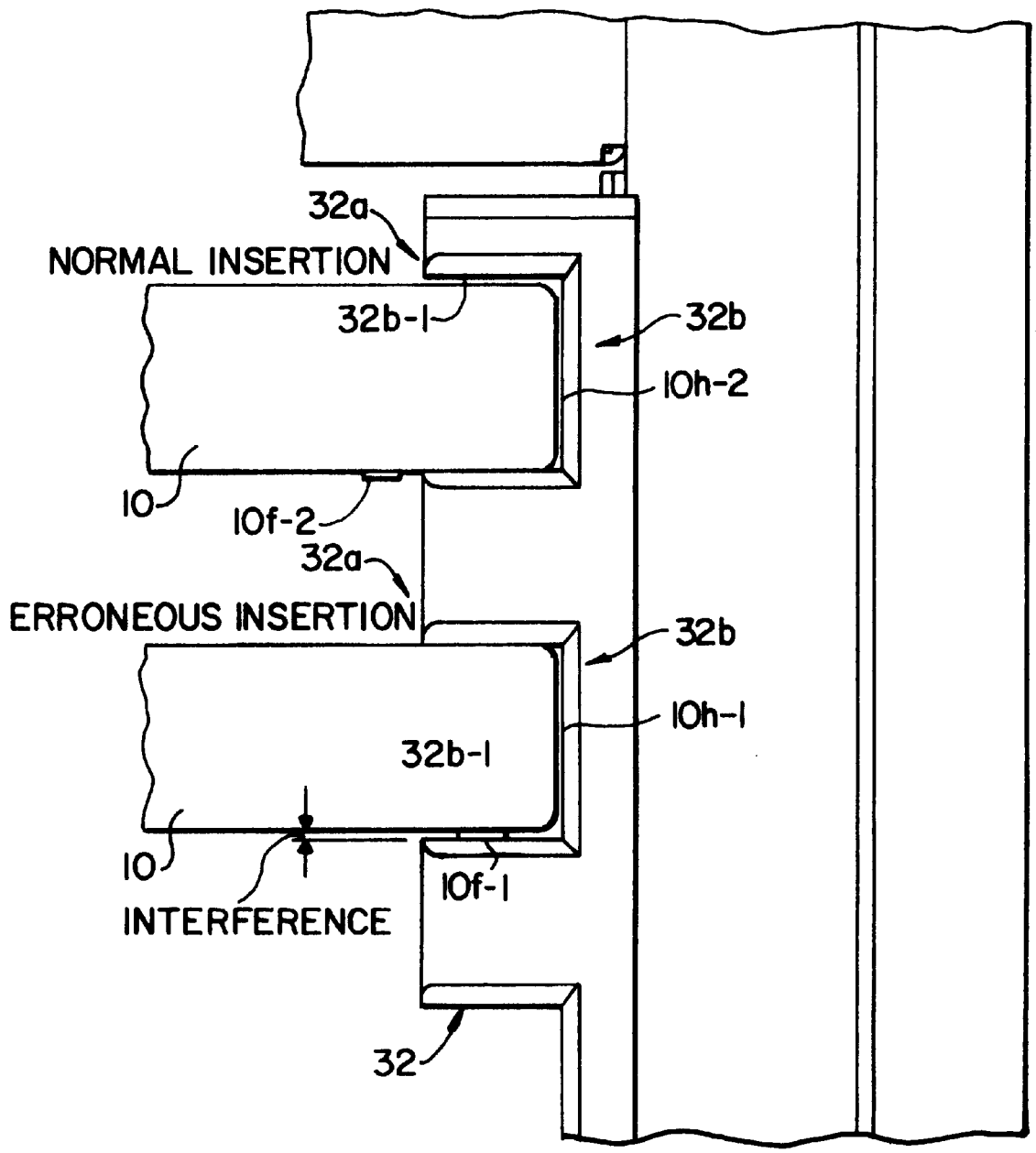
FIG. 12 is a front elevational view showing a principal portion of a rack for explaining the operation of the erroneous insertion preventing guide structure according to the present invention.
Figure 13:
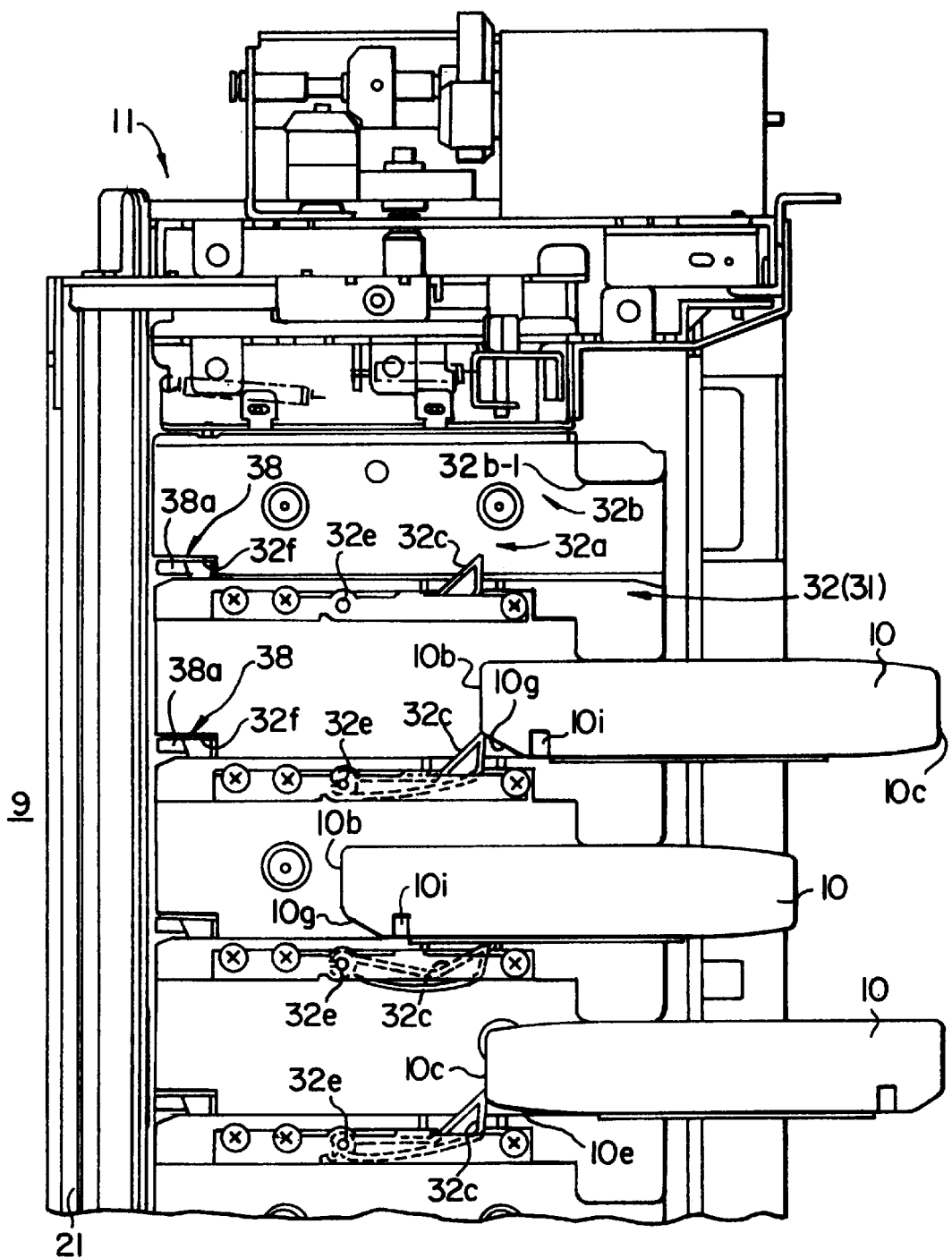
FIG. 13 is a side elevational view showing a rack including the erroneous insertion preventing guide structure and the erroneous insertion preventing lever according to the present invention.

As shown in FIGS. 11 to 13, the erroneous insertion preventing guide structure 32b is formed on the external space side of each of the guide grooves 32a. The guide structure 32b prevents the erroneous insertion of the cartridge 10 by the use of the fact that the two right- and left-hand projections 10f-1, 10f-2 on the bottom surface 10e of the cartridge 10 are not located symmetrically in its insertion direction.

In this embodiment, as shown in FIG. 12, comparing the normal insertion of the cartridge 10 with the erroneous insertion thereof in a state where the front and rear sides are upside down (the insertion in the opposite direction), the height of the cartridge 10 guided by the guide structure 32b varies by a quantity corresponding to the height of the projection 10f-1. Thus, the guide structure 32b has guide surfaces 32b-1 which generally come into contact with the right-hand circumferential portion of the cartridge 10, when the cartridge is inserted in the normal condition, and which guide the cartridge 10 thereby regulating the insertion made in the erroneous condition. The separation between the upper and lower guide surface 32b-1 is set to be slightly larger than the height (thickness) of the case of the cartridge 10 as shown in FIG. 12. However, the separation between the upper and lower guide surface 32b-1 is set to be slightly smaller than the dimension of the case height plus the projection 10f-1 height.

Accordingly, when normal insertion of the cartridge 10 takes place, the cartridge 10 is smoothly set in the rack 32, and if erroneous insertion occurs because the front and rear relation is upside down, as shown in the lower section of the FIG. 12, the guide surface 32b-1 of the guide structure 32b interferes with the projection 10f-1, whereupon the operator can recognize the erroneous insertion of the cartridge 10 because of experiencing the difficulty of the insertion of the cartridge 10 or using an immoderate force for the insertion, thus certainly preventing the erroneous insertion of the cartridge 10.

In the embodiment shown in FIGS. 11 and 13, the erroneous insertion preventing lever 32c is set in each of the guide grooves 32a on the right side. The lever 32c prevents the erroneous insertion of the cartridge 10 by making use of the tapered surface 10g on the front surface 10b side of the cartridge 10. Moreover, according to this embodiment, the cartridge 10 is inserted from only the tapered surface 10g shaped side when in the normal condition.

Thus, as shown in FIG. 13, the lever 32c is placed so that its tip portion protrudes from the lower surface of the guide groove 32a up to the position (the position slightly lower than the corner between the front surface 10b and the tapered surface 10g) of the tapered surface 10g. In addition, the proximal side portion of the lever 32c is rotatably supported on the rack 32 through the rotary shaft 32e so that the tip portion thereof can move up and down. Further, the lever 32c is biased by a spring (not shown) so that its tip portion turns upwardly.

Accordingly, when the cartridge 10 is inserted in the normal condition as shown in the upper and intermediate sections of FIG. 13, the tip portion of the lever 32c comes into contact with the tapered surface 10g and the lever 32c is moved downwardly by the tapered surface 10g while resisting the biasing force of a spring (not shown), whereupon the cartridge 10 can smoothly be set in the rack 32.

On the other hand, an operator is alerted to a situation where a cartridge 10 is inserted in an improper orientation by interference between the cartridge and the lever 32c. Specifically, when the cartridge is inserted while improperly oriented, the corner between the rear surface 10c and the bottom surface 10e directly runs into the tip portion of the lever 32c so that both interfere with each other (see, FIG. 13). Thus, the operator can recognize the erroneous insertion of the cartridge 10 because of the interference.

In FIG. 11, reference numeral 32d designates a cartridge insertion detecting lever provided in each of the left-hand guide grooves 32a. The lever 32d is pressed by the left side surface 10h-1 of the cartridge 10 when the cartridge 10 is correctly entering in each of the guide grooves 32a. In response to pressing the lever 32d, a cartridge set sensor (CSS) (not shown) operates to detect the insertion of the cartridge 10 in the guide groove 32a.

Furthermore, as shown in FIGS. 11 and 13, positioning levers 38 are set on both sides of each of the guide grooves 32a of the rack 32. The tip portions 38a of the levers 38 enter the right- and left-hand positioning grooves 10i of the cartridge 10, which positions the cartridge 10. A detailed description thereof will be described below. Further, as shown in FIG. 13, the tip portion 38a of the lever 38 is made to protrude from a groove 32f made in a side wall of each guide groove 32a toward the insertion space of the cartridge 10.

Figure 14:
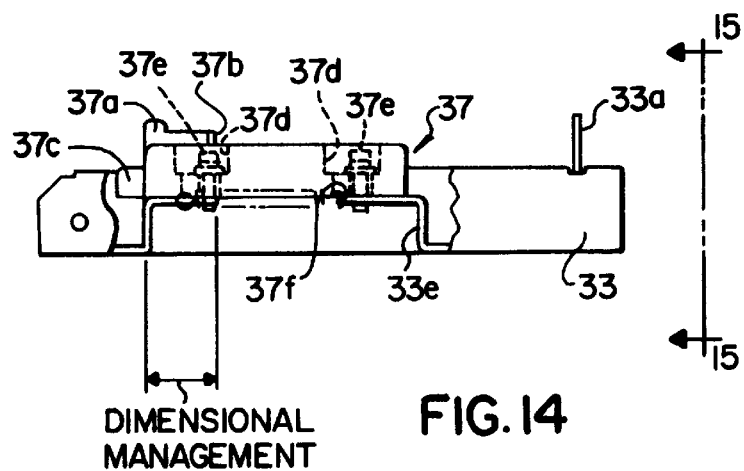
FIG. 14 is a partially broken plan view showing a portion of a door provided with a pushing component and a positioning mechanism therefor according to the present invention.
Figure 15:
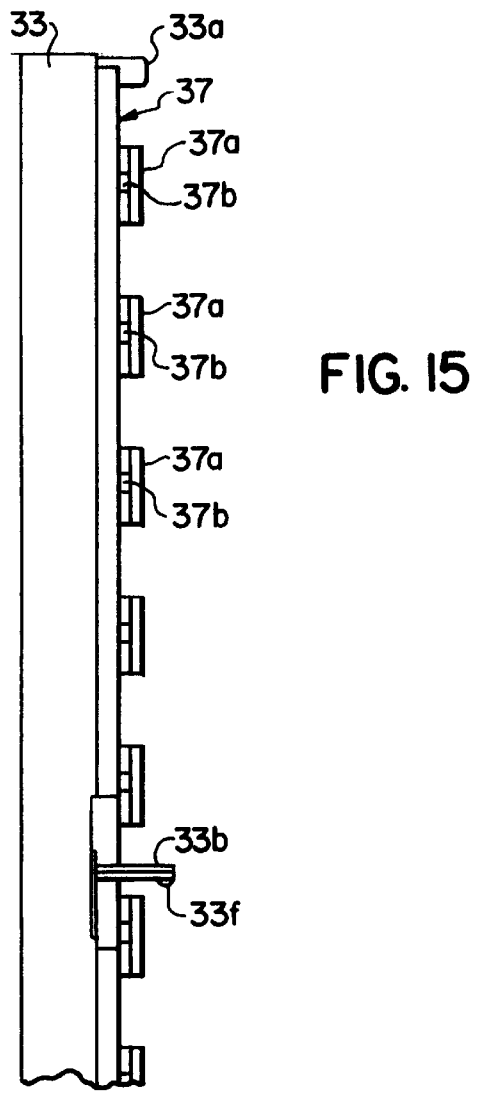
FIG. 15 is an illustration viewed from the perspective of an arrow XV in FIG. 14.

FIG. 14 is a plan view showing the door 33 (partially broken) which has the pushing component 37 and the positioning mechanism according to this embodiment, and FIG. 15 is an illustration viewed from an arrow XV direction in FIG. 14. Further, FIGS. 16 to 18 are plan views for describing the operations of the erroneous insertion preventing projection 37a and leader block pushing contact portion 37b according to this embodiment.

As shown in FIGS. 14 and 15, the pushing component 37 is fitted on the inner surface side of the door 33. The pushing component is made to contact an end surface of the cartridge 10, pushing the cartridge 10 into the rack 32 when the door 33 is moved into the closed condition. In addition, the erroneous insertion preventing projections 37a for preventing the erroneous insertion of the cartridge 10 and the contact portions 37b for pushing the leader block 10a of the cartridge 10 are provided in the pushing component 37 corresponding to the positions of the respective guide grooves 32a of the rack 32.

The erroneous insertion preventing projection 37a prevents the erroneous insertion of the cartridge 10 through the use of the chamfered portion 10d at the left side portion of the rear surface 10c of the cartridge 10. In this embodiment, when the cartridge 10 is inserted in the normal condition, the chamfered portion 10d is positioned on the left side of the door 33.

Figure 16:
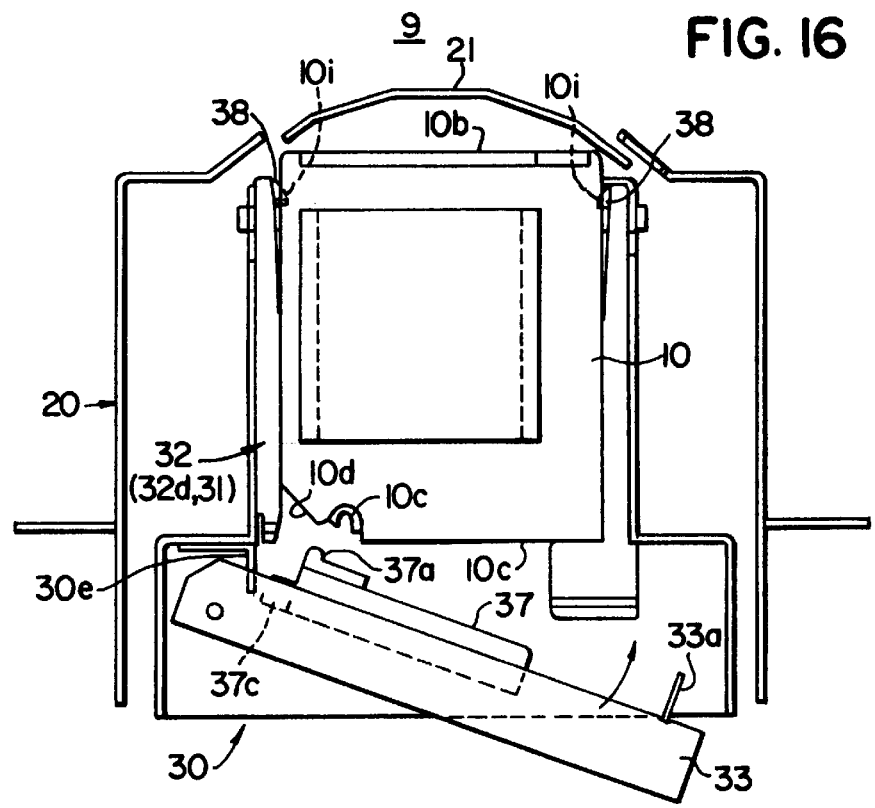
FIG. 16 is a plan view showing operations of an erroneous insertion preventing projection and leader block pushing contact portion according to the present invention.
Figure 17:
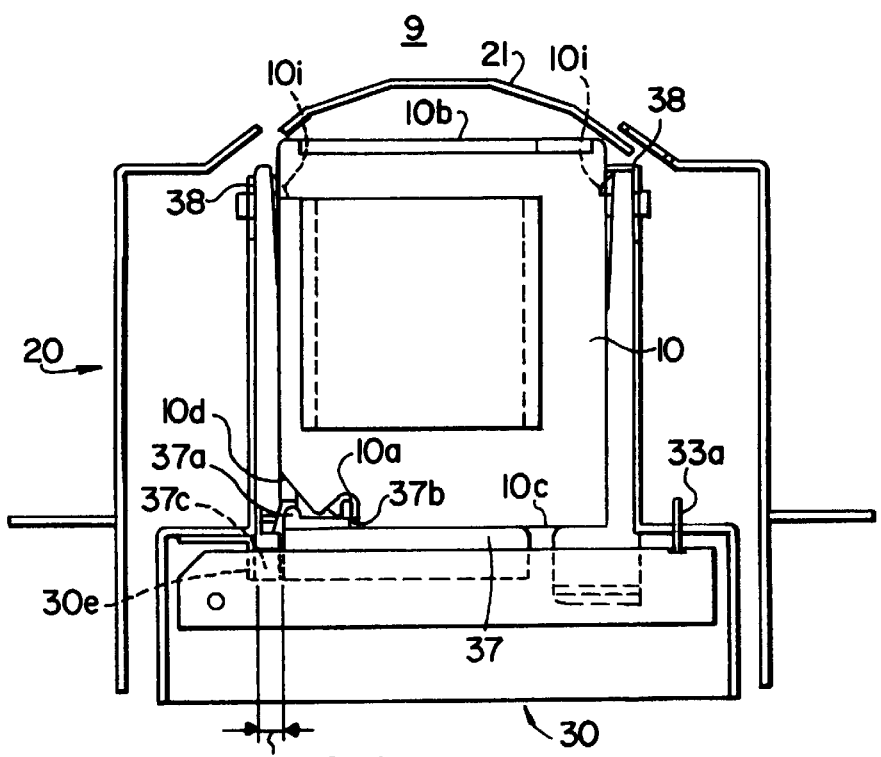
FIG. 17 is a plan view showing operations of an erroneous insertion preventing projection and leader block pushing contact portion according to the present invention.
Figure 18:
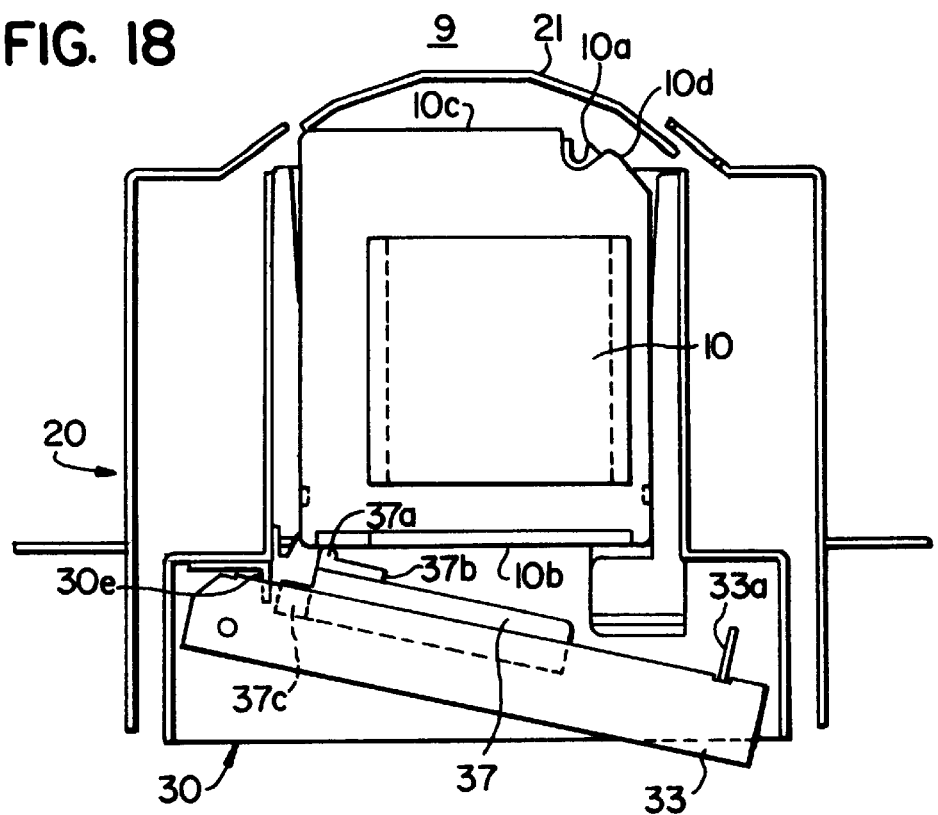
FIG. 18 is a plan view showing operations of an erroneous insertion preventing projection according to the present invention.

As shown in FIGS. 14, 16 and 17, when the cartridge 10 is inserted in the rack 32 in the normal condition, the projection 37a is configured to fit in a space defined by the chamfered portion 10d of the cartridge 10 when the door 33 is in the closed state.

Accordingly, as shown in FIGS. 16 and 17, when the cartridge 10 is inserted in the normal condition, at the closure of the door 33, the projection 37a is positioned in the space formed by the chamfered portion 10d of the cartridge 10, whereupon it is possible to close the door 33 without any problem.

On the other hand, if the cartridge 10 is erroneously inserted, i.e. the chamfered portion 10d does not face the door 33 (see, FIG. 18), the door 33 side projection 37a interferes with the front surface 10b of the cartridge 10. In this manner, the operator can recognize the erroneous insertion of the cartridge 10 because of the difficulty of closing the door 33.

The leader block 10a is located at the chamfered portion 10d of the cartridge 10, and the leader block pushing contact portion 37b is formed in the pushing component 37 in the vicinity of the erroneous insertion preventing projection 37a. The contact portion 37b within each of the guide grooves 32a of the rack 32 comes into contact with the tip portion of the leader block 10a when the door 33 is in the closed condition. In this manner, the leader block 10a is rotated in the housing locking direction and is reseated in the cartridge 10.

In order to assure that the leader block 10a is pushed to the cartridge 10 side, contact must be made between the contact portion 37b and the tip portion of the leader block. Accordingly, the dimensional accuracy between the door 33 side contact portion 37b and the rack 32 is an important and necessary factor. For this reason, the contact portion 37b (pushing component 37) is provided with a positioning mechanism. In particular, the positioning mechanism control the position of the contact portion 37b with respect to the leader block 10a in a manner that the frame structure 30e is used as a reference when the door 33 is in the closed condition. More specifically, as shown in FIG. 14, two right and left elongated holes 37d, 37d extending in the right- and left-hand directions are formed in the pushing component 37. Moreover, the pushing component 37 is slidably fitted to a fitting member 33e fixedly secured onto the inner surface side of the door 33 by fitting bolts 37e penetrating the respective elongated holes 37d.

In addition, the pushing component 37 has a positioning projection 37c on its left-hand end surface, which protrudes into contact with the frame 30e (the frame structure extending in the vertical directions on the left side of the rack 32) when the door 33 is in the closed condition. Further, the pushing component 37 is biased by a spring 37f in the direction of pressing the projection 37c against the frame 30e.

Furthermore, the dimensional part accuracy between the contact surface of the leader block pushing contact portion 37b (FIG. 14) and the contact surface of the positioning projection 37c is managed on the door 33 side, while the dimensional accuracy between the contact surface of the frame 30e (FIG. 17) and the inner surface of the rack 32 undergoes the management on the rack 32 side.

With the aforementioned composition, when the door 33 gets into the closed state, the positioning projection 37c comes into contact with the frame 30e to slide the pushing component 37 against the biasing force of the spring 37f, so that the leader block pushing contact portion 37b is positioned in contact with the tip portion of the leader block 10a. Thus, even if the door 33 deforms with use or even if the shaft of the door 33 loosens, the contact portion 37b and the tip portion of the leader block 10a always contact each other when the door 33 is in the closed condition.

A situation in which a cartridge 10 whose leader block 10a is not fully seated (FIG. 10) is inserted in the rack 32 is shown in FIGS. 16 and 17. However, at the closure of the door 33, the contact portion 37b comes into contact with the tip portion of the leader block 10a. The contact portion imparts a force which rotates the leader block 10a in the housing locking direction, and reseats the leader block 10a in the cartridge 10.

Moreover, the cartridge 10 is pushed into the door 33 side by the accessor 7A or 7B when the accessor comes to remove/insert a cartridge 10 from the rack 32. The force imparted by the accessor assures that contact is made between the tip portion of the leader block 10a and the contact portion 37b. Thus, even if the leader block 10a can not be pushed in the cartridge 10 at the closure of the door 33, or even if the leader block 10a of the cartridge 10 taken out from the MTU 5a and conveyed to the CAS 11 is out of place, it is possible to push the leader block 10a in the cartridge 10.

As described above, in the CAS 11 according to this embodiment, with the erroneous insertion preventing guide structure 32b, the erroneous insertion preventing lever 32c and the erroneous insertion preventing projection 37a, the erroneous insertion preventing function takes place at three stages, whereupon the erroneous insertion of the cartridge 10 into the rack 32 is surely preventable. In addition, their structures are realizable with a simple arrangement without adding a special mechanism, that is, with only the alteration of the configuration of the original parts for the CAS 11, which also saves space.

Furthermore, in the CAS 11 according to this embodiment, it is possible to surely push the leader block 10a in the cartridge 10 by the leader block pushing contact portion 37b, and therefore, unlike the conventional system, it is unnecessary to stop the system itself as the occurrence of errors for dealing with the defective cartridge 10 where the leader block 10a is out of place. This allows for more effective system operation.

Positioning Mechanism For A Cartridge

When taking out or inserting the cartridge 10 from/into the rack 32, the accessors 7A, 7B optically read out a sensor target (not shown) fixedly secured onto the rack 32 to recognize the position of the rack 32 (the cartridge 10). Accordingly, it is necessary for the cartridge 10 to always be positioned within a constant allowable range relative to the rack 32. Furthermore, when the operator inserts the cartridge 10 into the rack 32 from the external space side, it is also necessary to prevent the front surface 10b of the cartridge 10 from interfering with the shutter 21 by excessively pushing the cartridge 10.

Accordingly, positioning levers 38 are provided as a stopper to prevent the cartridge 10 from interfering with the shutter 21 (see FIGS. 11, 13, 16 and 19 to 23). The levers 38 are provided on both sides of each of the guide grooves 32a of the rack 32. Each positioning lever engages with the positioning grooves 10i of the cartridge 10 and position the cartridge 10. Referring to FIGS. 19 to 23, 11, 13 and 16, a description will be made of the detailed arrangement of a positioning mechanism (the positioning levers 38 and the positioning grooves 10i) of the cartridge 10.

Figure 19:
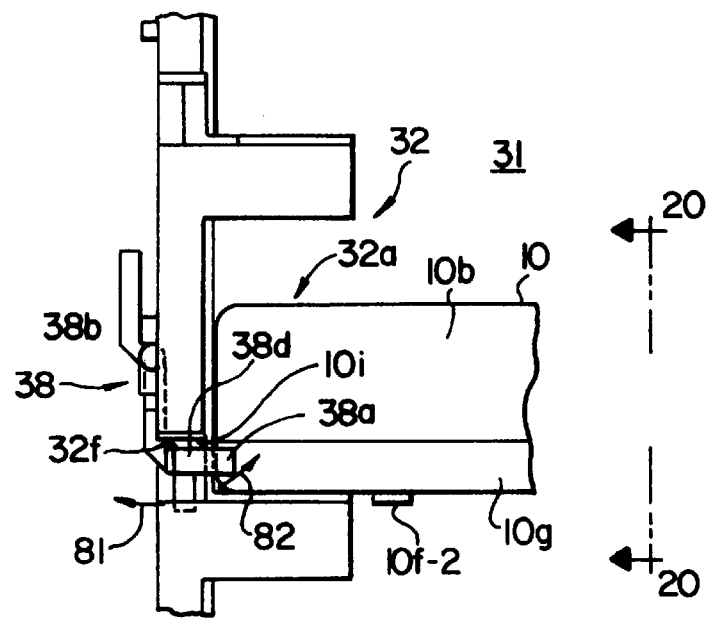
FIG. 19 is a front elevational view showing a principal portion of a rack having a positioning lever according to the present invention.

FIGS. 19 to 23 illustrate the positioning lever 38 according to one embodiment of the present invention. In particular, FIG. 19 is a front elevational view showing a principal portion of the rack 32, FIG. 20 is an illustration viewed from an arrow XX direction in FIG. 19, FIG. 21 is a plan view showing the engaging state (positioning condition) between the lever 38 and the positioning groove 10i, FIG. 22 is a side elevational view showing a tip portion 38a of the lever 38, and FIG. 23 is a side elevational view showing a state where the front end portion of the cartridge 10 runs on the tip portion 38a of the lever 38.

As shown in FIGS. 11, 13, 16 and 19 to 21, the positioning levers 38 are provided on a side of each of the guide grooves 32a. Each lever 38 is rotatably supported on a side wall of each guide groove 32 through a rotary shaft 38b so as to be swingable within a plane perpendicular to the insertion direction of the cartridge 10. As shown in FIG. 19, the lever 38 has an L-shaped configuration when viewed from the front side, and its tip portion 38a is made to protrude from a groove 32f defined in the side wall of each guide groove 32. Moreover, as shown in FIGS. 11, 16, 19 and 21, the tip portion 38a extends to the insertion space side of the cartridge 10. The positioning of the cartridge 10 is made in a manner that the tip portions 38a slide within the right- and left-hand positioning grooves 10i.

Still further, the tip portion 38a of the lever 38 is formed to have a tapered surface 38c (FIG. 21) inclined toward the door 33 (the external space). As shown in FIG. 22, the tip portion is formed to have a tapered surface 38d inclined toward the shutter 21 (the operating space 9) to separate from the cartridge 10.

With this structure, when the operator opens the door 33 and inserts the cartridge 10 in each of the guide grooves 32a of the rack 32, as shown in FIGS. 19 and 20, the front end side tapered surface 10g of the cartridge 10 comes into contact with the tip portion 38a of the lever 38, causing the tip portion 38a to swing to the outside (in the direction indicated by an arrow B1 in FIG. 19) and retreat the lever 38.

Thereafter, when the cartridge 10 is inserted further and the positioning groove 10i of the cartridge 10 reaches the tip portion 38a of the lever 38, the lever 38 swings inwardly (in the direction indicated by an arrow B2 in FIG. 19) by its own spring force. Then, as shown in FIGS. 16 or 21, the tip portion 38a enters the positioning groove 10i. Even if a further insertion of the cartridge 10 is attempted, a force to move the lever 38 does not work on the tip portion 38a since the groove 10i of the cartridge 10 does not have a tapered surface. Accordingly, the cartridge 10 can always be positioned within a constant allowable range with respect to the rack 32 (the guide groove 32a).

Furthermore, if the front end portion of the cartridge 10 lifts so as to run on the tip portion 38a of the lever 38 during insertion, the front surface 10b of the cartridge 10 interferes with the shutter 21, and inhibits the further insertion of the cartridge 10. Notably, if the front end portion of the cartridge 10 runs on the tip portion 38a of the lever 38, as shown in FIG. 23, the rear end surface of the groove 10i runs on the tapered surface 38c made in the tip portion 38a of the lever 38, and guided by the tapered surface 38c, the cartridge 10 returns to the regular position. Then, it is possible to prevent the cartridge 10 from excessively protruding to the shutter 21 side and, hence, to avoid interference with the shutter 21.

When the operator opens the door 33 to remove the cartridge 10 to the external space, as shown in FIG. 21, the front end surface of the groove 10i comes into contact with the tapered surface 38d made in the tip portion 38a of the lever 38. Further, a force to swing the lever 38 outwardly (in the direction indicated by an arrow B1 in FIG. 19) works on the tip portion 38a so that the lever 38 retreats and the cartridge 10 may be removed.

Moreover, when the accessors 7A, 7B insert the cartridge 10 from the operating space 9 side into the rack 32, the rear end portion of cartridge 10 comes into contact with the tapered surface 38d of the tip portion 38a of the lever 38, and causes the lever 38 to swing outwardly (in the arrow B1 direction in FIG. 19), so that the lever 38 retreats. Subsequently, when the cartridge 10 is further inserted and the positioning groove 10i of the side portion of the cartridge 10 reaches the position of the tip portion 38a of the lever 38, the lever 38 again swings inwardly (in the arrow B2 direction in FIG. 19) due to the spring force, and as shown in FIGS. 16 and 21, the tip portion 38a comes in the positioning groove 10i. When the accessors 7A, 7B take out the cartridge 10 to the operating space 9, the hand mechanism 7a of the accessors 7A, 7B lifts the cartridge 10 until it separates from the lever 38 and then takes out the cartridge 10.

Door Closure Detecting Mechanism

As previously described with reference to FIG. 6, when closing the door 33 of the CAS 11, the door 33 gets into the completely closed state at the time that the locking member 33b of the door 33 is engaged with the hook portion 54b of the door locking lever 54. In contrast, in a prior art system using a conventional detecting mechanism there is a possibility that the detecting mechanism will signal the closure of the door 33 before the locking member 33b completely engages with the hook portion 54b. Notably, errors may occur if the door 33 is placed in an incompletely closed condition. In addition, the safety of the operator may be jeopardized if a false signal is made that the door is in a closed condition and the accessors 7A, 7B are put into action. One possible solution to this problem is that the result of the detection of the door 33 closed condition by the aforesaid detecting mechanism is disregarded until firmware performs a timer monitoring and finds that the locking member 33b is completely engaged with the hook portion 54b. However, this method is not a complete solution to this problem.

For this reason, in one embodiment of the present invention there is provided a door closure detecting mechanism 60 (see FIGS. 24 to 26) which is designed to detect the closed condition of the door 33 in conjunction with the locking operation of the door locking mechanism 50 on the door 33. The door closure detecting mechanism 60 detects the closed condition of the door 33 only when the locking member 33b of the door 33 is completely hooked by the hook portion 54b of the door locking lever 54. Referring to FIGS. 24 to 26, a description will be made of the structure and operation of the door closure detecting mechanism 60.

FIGS. 24 to 26 are side elevational views describing the arrangement and operation of the door closure detecting mechanism 60 according to this embodiment. As shown in FIGS. 24 to 26, the door closure detecting mechanism 60 has a sensor flag 61, an optical door closure sensor (DCS) 62 and a spring 63.

The sensor flag 61 is provided in parallel to the door locking lever 54 (see FIG. 6) and is fitted to the side board 30b of the mechanical unit 30 in a state that its central portion is rotatably supported by the rotary shaft 54a of the lever 54.

Further, the sensor flag 61 is biased by the spring 63 so that its tip portion 61a turns upwardly. As shown in FIGS. 24 and 25, when the locking member 33b of the door 33 is not hooked by the hook portion 54b of the lever 54, the tip portion 61a of the sensor flag 61 is located to overlap with the hook portion 54b of the lever 54, and the proximal portion 61b of the sensor flag 61 is at a position (a position making the DCS 62 assume the non-detecting condition) between a light-emitting device and light-receiving device of the optical door closure sensor 62.

In FIGS. 24 to 26, the spring 57 is set to have the strongest biasing force of the of the springs 33d, 57, 63. The spring 33d is set to have the second strongest biasing force, and the spring 63 is set to have the weakest biasing force.

With the above-mentioned structure, as shown in FIG. 24, at the closure of the door 33, a tapered portion 54d formed at the tip portion of the door locking lever 54 comes into contact with the roller 33f rotatably attached to the tip portion side of the locking member 33b of the door 33. In particular, the roller 33f rises along the tapered portion 54d. Thus, the locking member 33b rotates and moves upwardly along the circumference of the rotary shaft 33c against the biasing force of the spring 33d. Further, when the center of the roller 33f reaches the summit of the tapered portion 54d as shown in FIG. 25 and passes through this summit, the locking member 33b, together with the roller 33f, vertically drops to the interior of the hook portion 54b of the lever 54 as shown in FIG. 26 to get into engagement with the hook portion 54b.

Since the biasing force of the spring 57 is set to be greater than that of the spring 33d, when the locking member 33b (roller 33f) gets over the tapered portion 54d of the lever 54, the lever 54 does not rotate due to a force from the locking member 33b. In addition, because the biasing force of the spring 33d is set to be stronger than that of the spring 63, when the locking member 33b is hooked by the hook portion 54b, as shown in FIG. 26, the tip portion 61a of the sensor flag 61 is pressed downwardly. Whereupon, the sensor flag 61 rotates along the rotary shaft 54b and the rear end portion 61b of the sensor flag 61 separates from between the light-emitting device and light-receiving device of the optical door closure sensor 62, so that the door closure sensor 62 comes into the detecting condition, and at this time the detection of the closed condition of the door 33 becomes possible.

As described above, in the door closure detecting mechanism 60 according to this embodiment, the door closure sensor 62 does not make the detection of the closed condition of the door 33 before the locking member 33b of the door 33 is completely hooked by the hook portion 54b of the door locking lever 54. Accordingly, the operation of the accessors 7A, 7B becomes possible after the detection of the completely closed condition of the door 33, which ensures the security of the operator.

Second Shutter Locking Mechanism And Mechanical Unit Locking Mechanism

As described above, it is possible to prevent an operator from inserting a hand or the like into the operating space (accessor passage) 9, irrespective of whether the mechanical unit 30 is detached in a manner that the shutter 21 of the shutter unit 20 is kept in the closed state. The CAS 11 according to this embodiment further includes a second shutter locking mechanism 45 (see FIGS. 27 and 28) for inhibiting a person from manually opening the shutter 21 when the mechanical unit 30 is in the detached condition. In addition, a mechanical unit locking mechanism 70 (see FIGS. 29 to 31) inhibits a person from manually detaching the mechanical unit 30 when the shutter 21 is in the open state, which contributes further to the security of the operator. Referring to FIGS. 27 to 31, a description will be made hereinbelow of the detailed constructions of these locking mechanisms 45 and 70.

Figure 27:
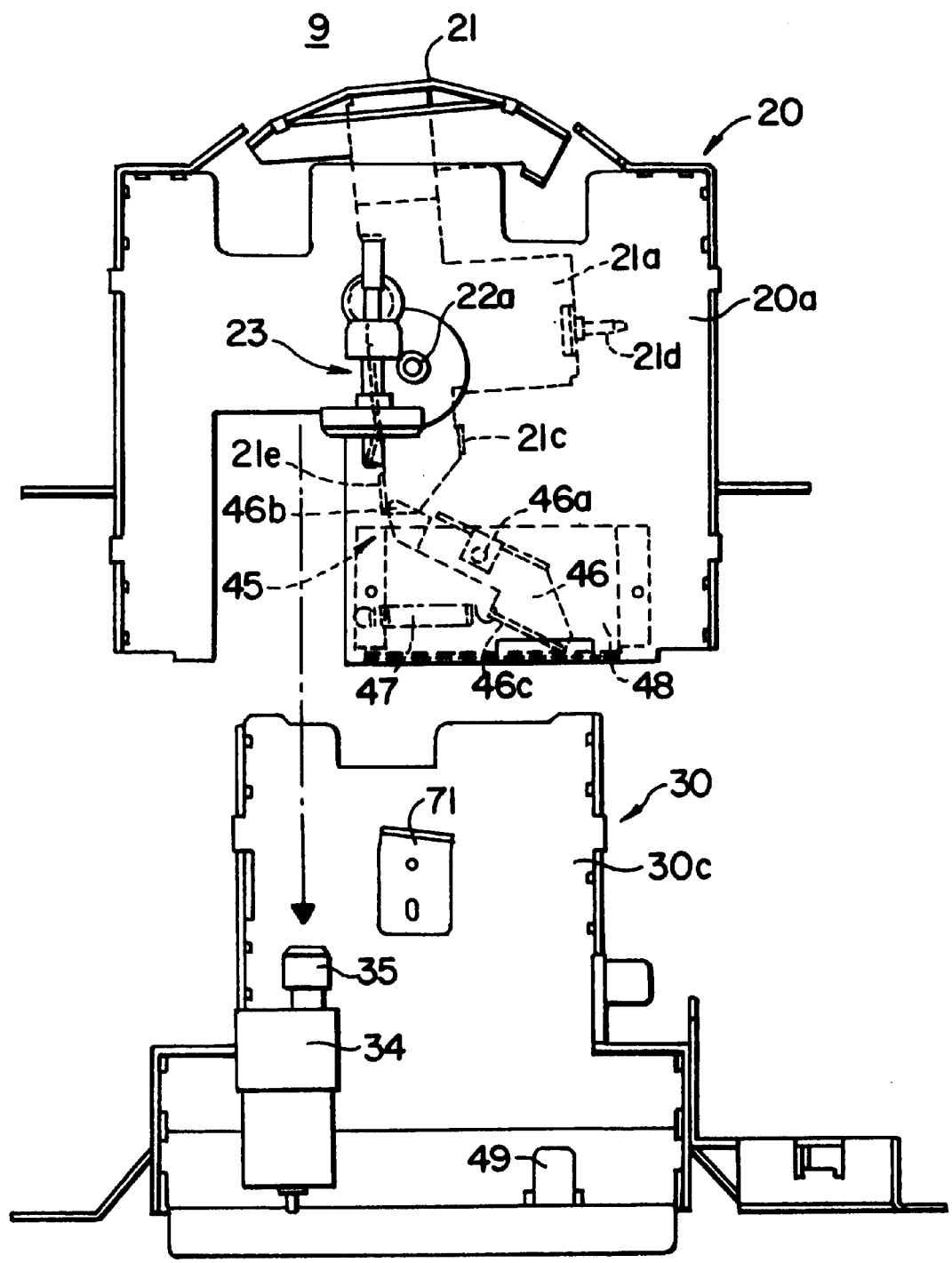
FIG. 27 is a plan view showing a locking condition of a second shutter locking mechanism according to the present invention.
Figure 28:
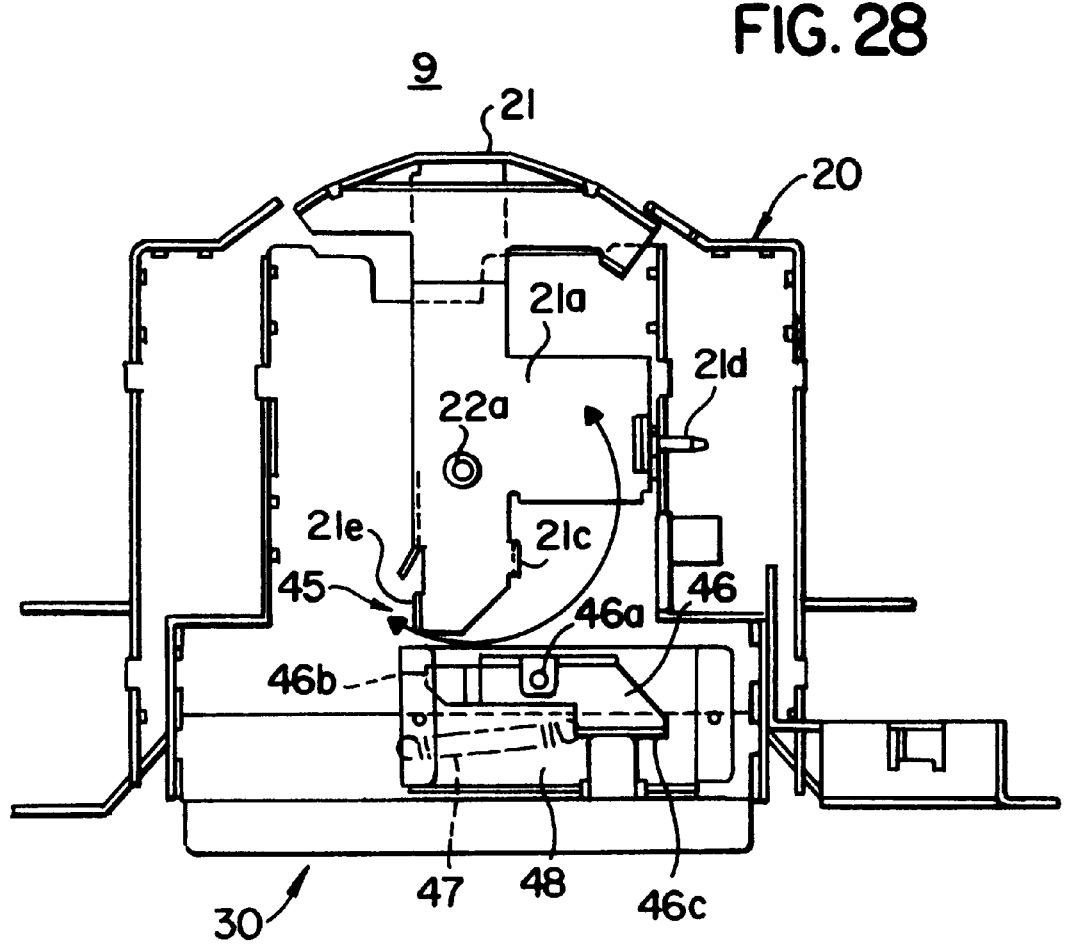
FIG. 28 is a plan view showing an unlocking condition of a second shutter locking mechanism according to the present invention.

FIGS. 27 and 28 are plan views showing the locking condition and unlocking condition of the second shutter locking mechanism 45, respectively. In FIG. 28, omitted are the top board 20a of the shutter unit 20, the drive motor 34, the gear mechanism 23, the first shutter locking mechanism 40 and others while clearly shown are the portions for the second shutter locking mechanism 45.

As shown in FIGS. 27 and 28, the second shutter locking mechanism 45 inhibits (lock) the shutter 21 from opening while the mechanical unit 30 is detached from the shutter unit 20 and allows (unlock) the opening of the shutter 21 when the mechanical unit 30 is attached to the shutter unit 20. The second shutter locking mechanism 45 is made up of a shutter locking contact portion 21e formed on the supporting plate 21a of the shutter 21, a shutter lock-releasing projection 49 attached to the mechanical unit 30, a shutter locking lever 46 fitted to a lower surface side of the top board 20a of the shutter unit 20, and a spring 47.

The shutter locking contact portion 21e is, as shown in FIG. 28, formed by bending a portion of the supporting plate 21a upwardly on the side opposite to the shutter 21 with respect to the rotary shaft 22a.

Furthermore, the shutter locking lever 46 is fitted to a lower surface side of the top board 20a of the shutter unit 20 through a rotary shaft 46a to be rotatable within a plane generally equal to the supporting plate 21a. One end side of the lever 46 is provided with a shutter locking contact portion 46b which is made to come into contact with the shutter locking contact portion 21e of the supporting plate 21a, while the other end side thereof is equipped with a shutter lock-releasing contact portion 46c which is designed to come into contact with the shutter lock-releasing projection 49, fitted onto the mechanical unit 30, when the mechanical unit 30 is fitted to the shutter unit 20.

Still further, owing to a spring 47 interposed between the lever 46 and the top board 20a of the shutter unit 20, the lever 46 is biased to be located at a locking position shown in FIG. 27. At the locking position, the contact portion 46b of the lever 46 comes into contact with the contact portion 21e of the supporting plate 21a to control the opening operation (the rotation in an arrow C1 direction) of the shutter 21.

In FIGS. 27 and 28, reference numeral 28 represents a cover fitted to a lower surface side of the top board 20a of the shutter unit 20 for covering the lever 46 and the spring 47 from the below, and numeral 71 designates a stopper constituting the mechanical unit locking mechanism 70 (see FIGS. 29 to 31).

Furthermore, for attaching and detaching the mechanical unit 30 to and from the shutter unit 20, the first shutter locking mechanism 40 (the shutter locking lever 41 on the top board 30c of the mechanical unit 30 and the spring 42) described before with reference to FIGS. 3 and 4 is located at a position lower than that of the aforesaid second shutter locking mechanism 45 (a cover 48), and hence it does not interfere with the second shutter locking mechanism 45.

With the above-mentioned arrangement, as shown in FIG. 27, when the mechanical unit 30 is detached from the shutter unit 20 in a state where the communication space 31 (the rack 32) is closed by the shutter 21 from the operating space 9 side, in response to the biasing force of the spring 47 the lever 46 comes to the locking position. At this locking position the contact portion 46b of the lever 46 and the contact portion 21e of the supporting plate 21a come into contact with each other to cause the shutter 21 to be in the locked condition, thus inhibiting the opening operation (the rotation in the arrow C1 direction) of the shutter 21.

Moreover, when the mechanical unit 30 is fitted to the shutter unit 20, the projection 49 of the mechanical unit 30 contacts and presses the contact portion 46c of the lever 46 to rotationally move the lever 46 in an arrow C2 direction in FIG. 27 against the biasing force of the spring 47, so that the lever 46 comes to the unlocking position shown in FIG. 28. At this unlocking position, the contact portion 46b of the lever 46 retreats from the rotating area of the contact portion 21e of the supporting plate 21a to release the contact portions 21e and 46b from the interference, whereupon the shutter 21 is unlocked and gets into the state where it can rotationally move in the arrow C1 direction in FIG. 3, that is, it can assume the opening operation as shown in FIG. 28.

Figure 29:
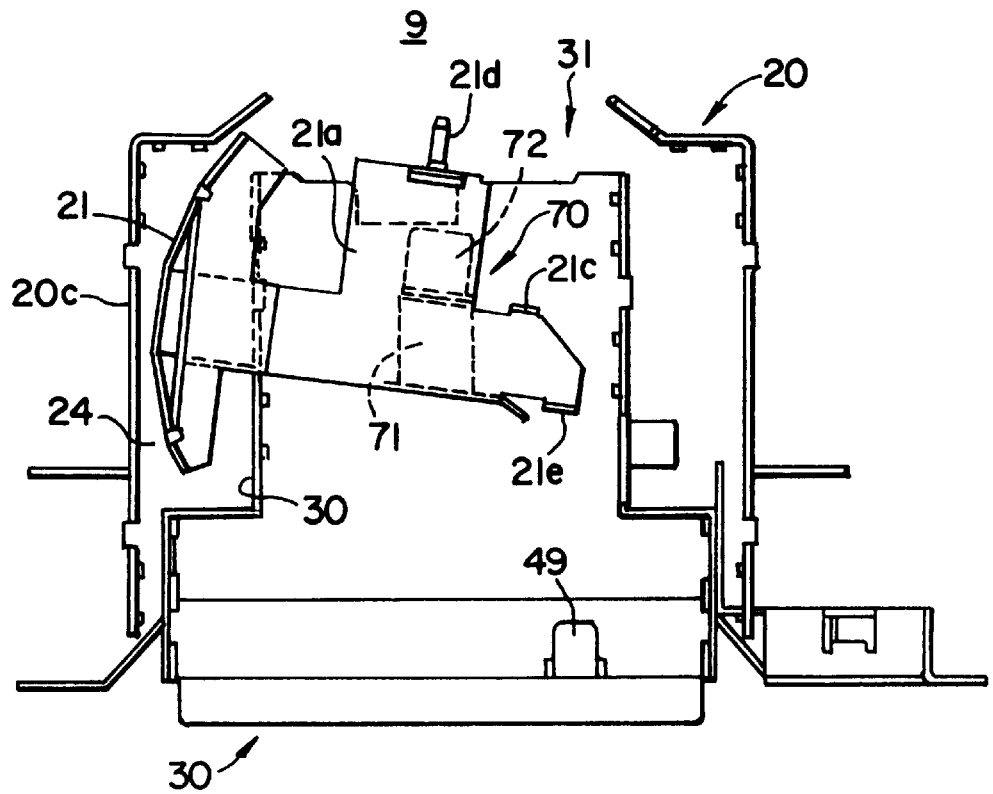
FIG. 29 is a plan view showing a locking condition of a mechanical unit locking mechanism according to the present invention.
Figure 30:
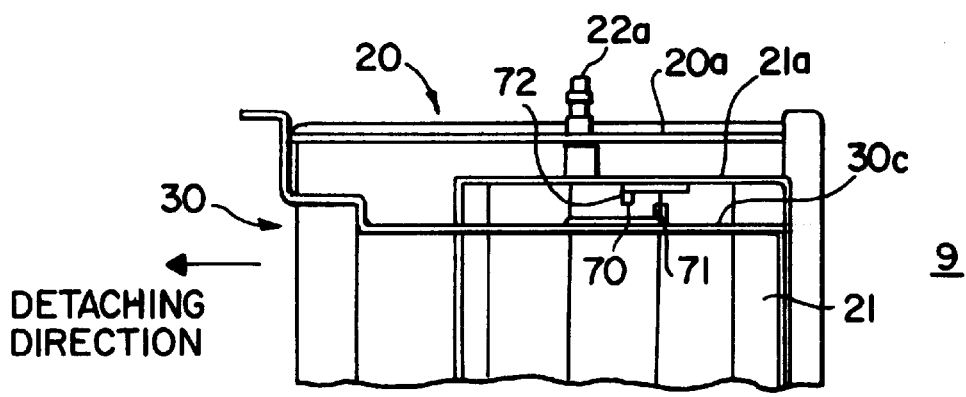
FIG. 30 is a side elevational view showing a locking condition of a mechanical unit locking mechanism according to the present invention.
Figure 31:
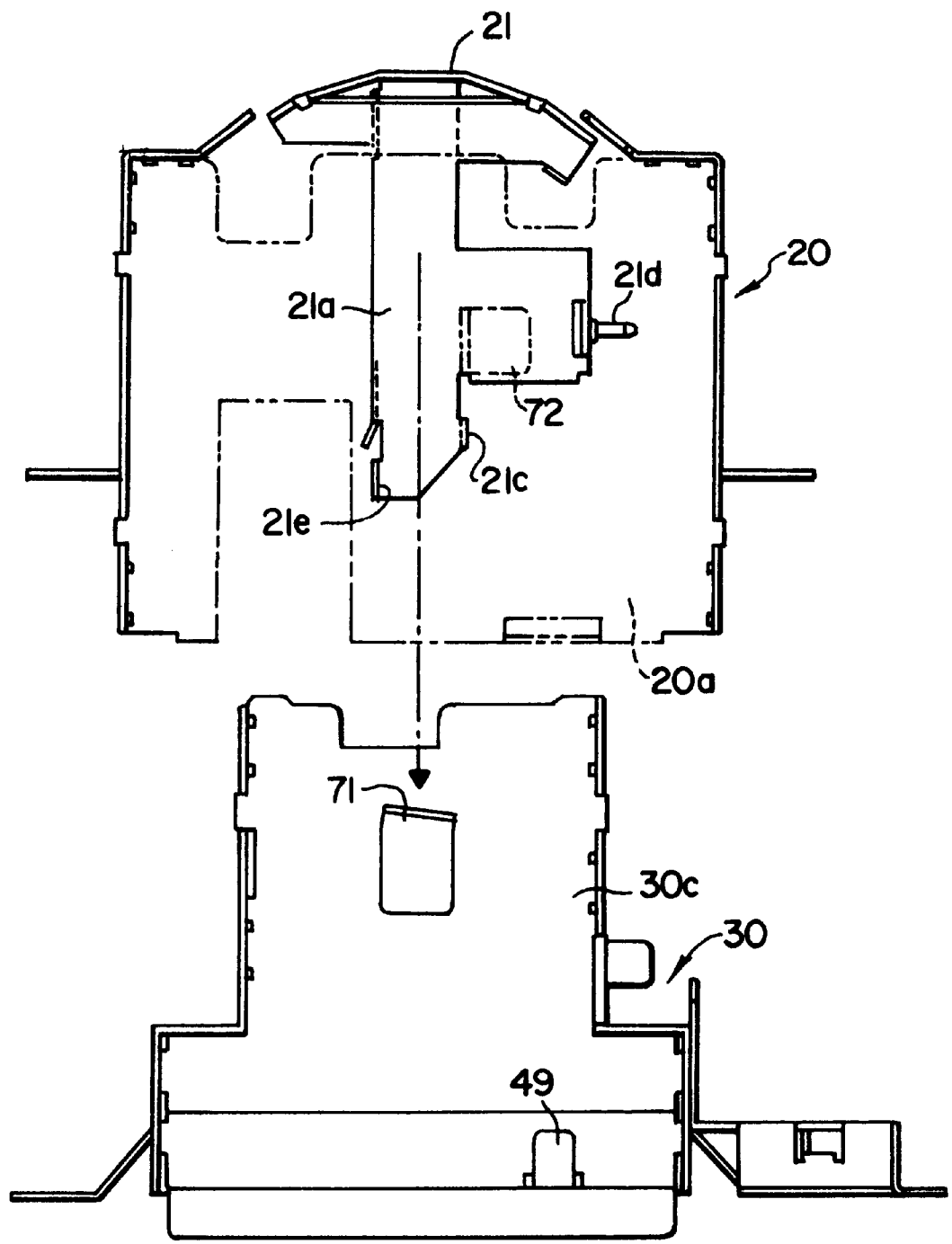
FIG. 31 is a plan view showing an unlocking condition of a mechanical unit locking mechanism according to the present invention.

FIGS. 29 to 31 are illustrations of the mechanical unit locking mechanism 70, and FIGS. 29 and 30 are a plan view and a side elevational view showing its locking condition while FIG. 31 is a plan view showing its unlocking condition. In FIGS. 29 and 31, omitted are the top board 20a of the shutter unit 20, the drive motor 34, the gear mechanism 23, the locking mechanisms 40, 45 and others while clearly illustrated are only the portions for the mechanical unit locking mechanism 70.

The mechanical unit locking mechanism 70 is, as shown in FIGS. 29 to 31, designed to inhibit (lock) the detaching operation of the mechanical unit 30 from the shutter unit 20 when the shutter 21 is in the open condition. Moreover, the mechanical unit locking mechanism 70 is designed to allow (unlock) the detaching operation when the shutter 21 is in the closed condition. The mechanical unit locking mechanism 70 includes a stopper 71 attached to the top board 30c of the mechanical unit 30 and a stopper 72 fitted to a lower surface of the supporting plate 21a.

The stopper 71 is formed to protrude upwardly from the top board 30c of the mechanical unit 30, whereas the stopper 72 is formed to protrude downwardly from a lower surface of the supporting plate 21a. Further, the stopper 72 is attached to the supporting plate 21a to be situated in opposed relation to the stopper 71 of the mechanical unit 30 from the external space side as shown in FIGS. 29 and 30 when the shutter 21 is in the open condition, and attached thereto to retreat from the external space side (the area through which the stopper 71 passes at the detachment of the mechanical unit 30) of the stopper 71 as shown in FIG. 31.

Although in FIGS. 29 to 31 only the mechanical unit locking mechanism 70 placed above the shutter 21 exists in the illustrations for the description of its construction, the same mechanism is also provided under the shutter 21, that is, between the bottom board 30d of the mechanical unit 30 and the supporting plate 21b of the shutter 21. These two upper and lower mechanisms 70 are designed to lock/unlock the mechanical unit 30.

With the above-described arrangement, since, as shown in FIGS. 29 and 30, the stopper 72 is situated in opposed relation to the stopper 71 from the external space side when the shutter 21 is in the open state, the interference between the stoppers 71 and 72 takes place to control the detachment of the mechanical unit 30 from the shutter unit 20.

On the other hand, when the shutter 21 is in the closed condition, as shown in FIG. 31, the stopper 72 retreats from the external space side of the stopper 71, and therefore the interference with the stopper 71 is avoided, and detachment of the mechanical unit 30 from the shutter unit 20 is permitted.

As described above, the second shutter locking mechanism 45 inhibits the opening operation of the shutter 21 at the detachment of the mechanical unit 30, and the upper and lower mechanical unit locking mechanism 70 inhibits the detaching operation of the mechanical unit 30 at the opening of the shutter 21. In this manner, even if the mechanical unit 30 is dismounted for maintenance, it is possible to surely prevent an operator from inserting a hand or the like from into the operating space 9 where the accessors 7A, 7B travel. Moreover, the above features prevent the mechanical unit 30 from being dismounted by mistake in the opening condition of the shutter 21, thereby ensuring the safety of the operator. In addition, in the case of the CAS 11 according to this embodiment, the aforesaid locking/unlocking functions are easily realizable with a mechanical means linked with the operation of the shutter 21 or the detaching operation of the mechanical unit 30, and further space-saving is feasible because there is no necessity for the special formation of spaces for the locking mechanisms 45 and 70.

As previously mentioned, the rotary shutter 21 may be locked, for example, by an electrical locking method. Alternatively, the rotary shutter 21 may be locked by locking a gear portion of the gear mechanism 23 connected with the shutter 21 by means of a latch interlocked with the mechanical unit 30. However, the former is not preferable because of its high cost and a high probability of occurrence of problems, while the latter can not provide a sure locking condition because of its weak strength. On the other hand, the shutter locking mechanism 45 according to the present invention, which locks the shutter 21 by the lever 46 linked with the detaching operation of the mechanical unit 30, is preferable in every respect including cost, assembling, performance stability and reduction of development time period.

Entry And Exit Operations Of A Cartridge

Figure 32A:
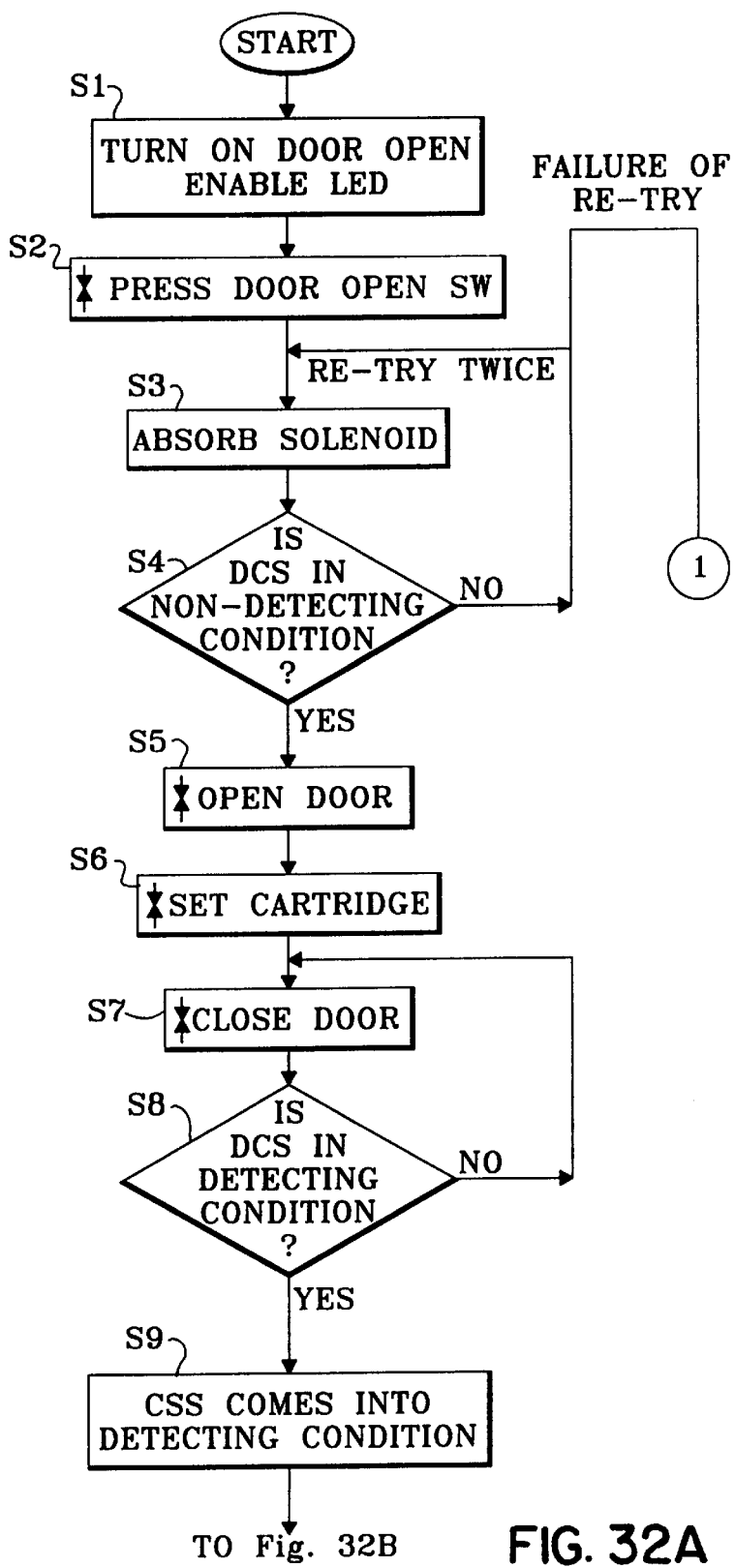
FIG. 32 is a flow chart describing an entry operation of a cartridge according to the present invention.
Figure 32B:
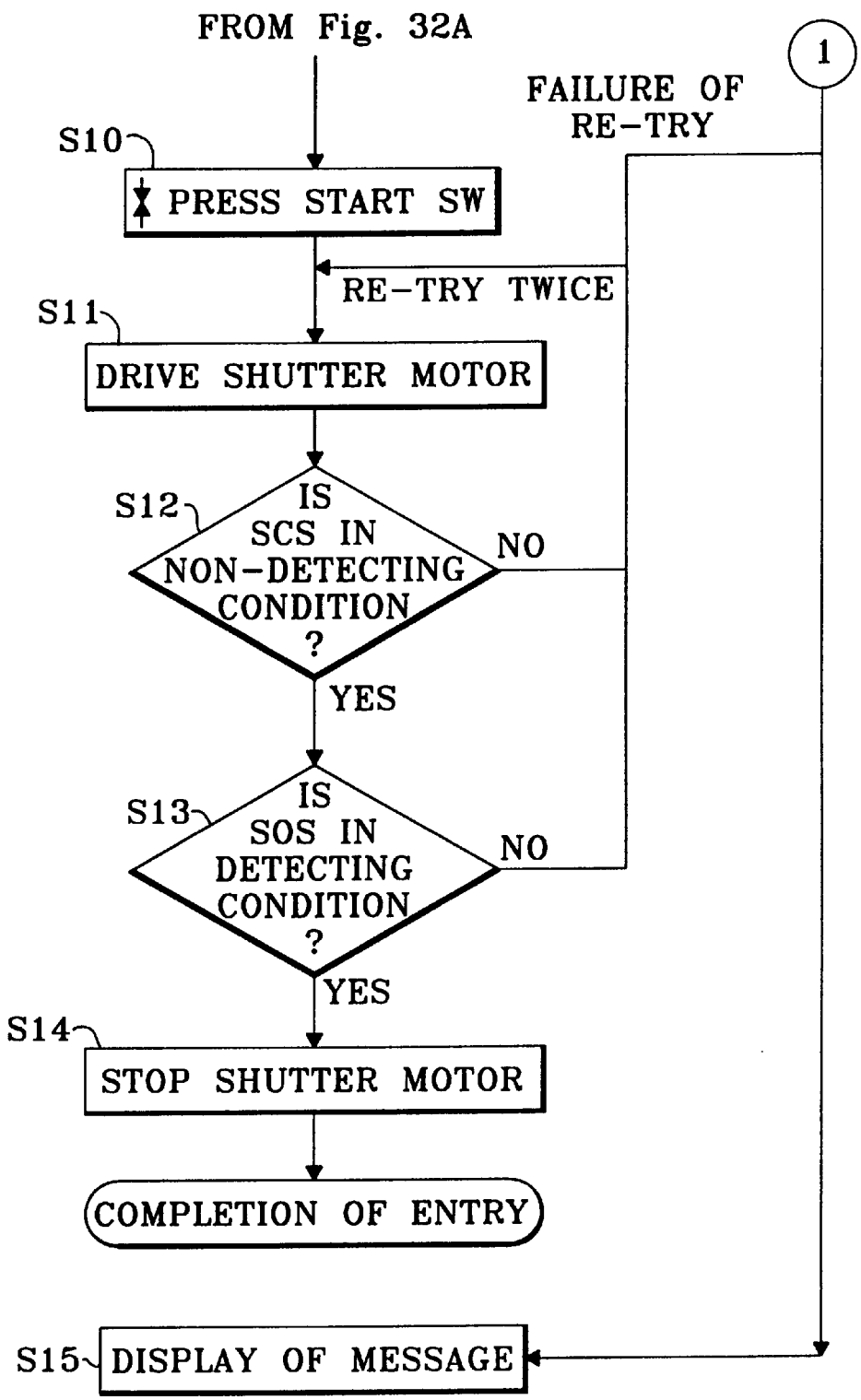

The operation for entry of the cartridge 10 into the CAS 11 will be described with reference to the flow chart (steps S1 to S15) shown in FIG. 32. In FIG. 32, the steps indicated with a mark "*" procedures to be conducted by the operator.

Prior to inserting a cartridge 10 into the CAS 11, the operator confirms the lighting of an LED (not shown) indicative of the fact that the door 33 is in the openable condition, i.e., the shutter 21 is in the closed state (step S1). Then, the operator activates a switch (not shown) to open the door 33 (step S2). In response to pressing this switch, the door opening solenoid 58 is excited so that the door locking lever 54 is drawn downward against the biasing force of the spring 57 (step S3). Accordingly, the locking member 33b of the door 33 and the hook portion 54b of the lever 54 are released from engagement and the door closure sensor (DCS) 62 comes into the non-detecting condition.

In this embodiment, the controller (not shown) for managing the operation of the library apparatus 1 checks whether or not the DCS 62 is in the non-detecting condition (step S4). If the DCS 62 is still in the non-detecting condition, the controller re-tries the absorption by the solenoid 58 (step S3) and the decision on the non-detecting condition of the DCS 62 (step S4) twice. Then, if the decision to DCS 62 is still unable to detect a door closure, an appropriate error message is displayed (step S15).

If the decision of the step S4 is made that the DCS 62 is in the non-detecting condition, the operator opens the door 33 (step S5) and puts the cartridge 10 in the rack 32 (step S6) and subsequently closes the door 33 (step S7).

Furthermore, when the aforesaid controller makes a decision that the locking member 33b of the door 33 is hooked by the hook portion 54b of the lever 54 and the DCS 62 is put into a detecting condition (decision "YES" in step S8), the cartridge insertion detecting lever 32d sees that a cartridge set sensor (CSS) operates and comes into a detecting condition (step S9).

Thereafter, when the operator actuates a start switch (START SW) (step S10), simultaneously with giving a signal representative of permission to take out the cartridge 10 from the CAS 11 by the accessors 7A, 7B, the shutter motor 34 operates to open the shutter 21 (step S11).

Still further, when the controller decides that a shutter closure sensor (SCS; not shown) for detecting the completely closed condition of the shutter 21 comes into the non-detecting state (the decision "YES" in step S12) and that a shutter open sensor (SOS; not shown) for detecting the completely open condition of the shutter 21 gets into the detecting state (the decision "YES" in step S13), the operation of the shutter motor 34 is stopped (step S14) and the entry of the cartridge 10 is completed.

On the other hand, if no decision is made to the non-detecting condition of the SCS (the decision "NO" in step S12) or if no decision is made to the detecting condition of the SOS (the decision "NO" in step S13), the controller re-tries the drive by the shutter motor 34 (step S11), the decision on the non-detecting condition of the SCS (step S12) and the decision on the detecting condition of the SOS (step S13) twice. Nevertheless, if the system does not reach the SCS non-detecting condition or the SOS detecting condition, a message display takes place (step S15).

Subsequently, referring to the flow chart (steps S21 to S38) of FIG. 33, a description will be made of the exit operation for ejecting a cartridge 10 from the CAS 11. In FIG. 32, the steps indicated with the mark "*": signify the procedure to be done by the operator.

For the exit of the cartridge 10 from the CAS 11 to the external space side, the operator checks the lighting of the LED (not shown; DOOR OPEN ENABLE LED) indicative of the door 33 being in the openable condition (the closed condition of the shutter 21) (step S21) and actuates the switch (not shown) for opening the door 33 (step S22).

In response to pressing this switch, the shutter motor 34 operates to open the shutter 21 (step S23). When the aforesaid controller decides that the SOS is in the non-detecting condition (the decision "YES" in step S24) and further decides that the SCS is in the detecting condition (the decision "YES" in step S25), the operation of the shutter motor 34 stops (step S26). However, if a "No" decision is made of the SOS non-detecting condition (the decision "NO" in step S24) or the SCS detecting condition (the decision "NO" in step S25), the drive by the shutter motor 34 (step S23), the decision on the "No" detecting condition of the SOS (step S24) and the decision on the detecting condition of the SCS (step S25) are repeated twice. Nevertheless, if a "No" decision is made regarding the detecting condition of the SOS or to the detecting condition of the SCS, a message display takes place (step S38).

When the operation of the shutter motor 34 stops, the door opening solenoid 58 is excited to absorb the door locking lever 54 downwardly against the biasing force of the spring 57 (step S27). Thus, the locking member 33b of the door 33 and the hook portion 54b of the lever 54 are released from engagement, so that the DCS 62 comes into the "No" detecting condition. Further, the controller checks whether or not the DCS 62 is in the non-detecting condition (step S28). In the case of a "No" decision regarding the detecting condition, the absorption by the solenoid 58 (step S27) and the "No" decision regarding the detecting condition of the DCS 62 (step S28) are repeated twice. Nevertheless, if a "No" decision is made regarding the detecting condition of the DCS 62, a message display takes place (step S38).

On the other hand, when the decision of step S28 is that the DCS 62 comes to the "No" detecting condition, the operator opens the door 33 (step S29) and takes out the cartridge 10 from the rack 32 (step S30) and then closes the door 33 (step S31).

Furthermore, when making a decision to that the locking member 33b of the door 33 is hooked by the hook portion 54b of the lever 54 and the DCS 62 is put into the detecting condition (the decision "YES" in step S32), the controller confirms that the cartridge set sensor (CSS) is in the detecting condition (step S33) and then operates the shutter motor 34 to open the shutter 21 (step S34).

In addition, as well as the steps S11 to S14 in FIG. 32, when in the controller a decision is made that the SCS is in the non-detecting condition (the decision "YES" in step S35) and a decision is made that the SOS is in the detecting condition (the decision "YES" in step S36), the operation of the shutter motor 34 stops (step S37), and the discharge of the cartridge 10 comes to completion. However, if a "No" decision is made with respect to the detecting condition of the SCS (the decision "NO" in step S35) or to the detecting condition of the SOS (the decision "NO" in step S36), the drive by the shutter motor 34 (step S34), the decision on the SCS "No" detecting condition (step S35) and the decision on the SOS detecting condition (step S36) are repeated twice. Nevertheless, in the case of a "No" decision regarding the SCS detecting condition or a "No" decision of the SOS detecting condition, a message display takes place (step S38).

In operation, the cartridge entry/exit station 11 facilitates the entry and exit of a plurality of cartridges 10 to and from the library apparatus 1. The cartridges 10 are transported from the cartridge entry/exit station 11 to a processing section of a drive unit 5 by a transferring mechanism 7A, 7B. The cartridges 10 are not rotated in the communication space 31 while other cartridges are processed by the transferring mechanism 7A, 7B.

The cartridge entry/exit station 11 includes a storage rack 32 arranged to be accessible from the operating space side 9 while simultaneously isolating the storage rack 32 from the external space side. Likewise, the storage rack 32 is arranged to be accessible from the external space side while simultaneously isolating the storage rack 32 from the operating space side 9.

Although the above description of this embodiment has been made in the case of the library apparatus 1 where the LAU 2, RAU 3, CSU 4, TMU 5 and AEU 6 are in connecting relation to each other, the present invention is not limited to this arrangement, but covers any unit arrangement as long as the library apparatus is equipped with the CAS, which can provide the same operation and effects as those in the abovedescribed apparatus.

A preferred embodiment of the cartridge entry/exit station of the present invention has been described herein. It is to be understood, of course, that changes and modifications may be made in the embodiment without departing from the true scope and spirit of the present invention as defined by the appended claims.

What is claimed is:

1. A cartridge entry/exit station for use in a library apparatus that includes a storage unit for storing a number of cartridges, each of which accommodates a storage medium, a drive unit for performing a desired process on the storage medium in the individual cartridges, and a transferring mechanism for transferring the individual cartridges in the library apparatus, said cartridge entry/exit station being operable to carry out entry and exit of the individual cartridges, said cartridge entry/exit station comprising:

means defining a communication space for communicating with both an internal operating space of the library apparatus, within which space the transferring mechanism operates, and an external space of the library apparatus, said communication space defining means having a rack for guiding insertion/discharge of one of the individual cartridges between the internal operating space and the external space and for storing the one cartridge;

a door, movably mounted on said communication space defining means, for covering said rack from the external space;

a shutter, movably mounted on said communication space defining means, for covering said rack from said internal operating space;

a drive mechanism for driving said shutter into one of an opened posture and a closed posture;

a first shutter locking mechanism responsive to movement of said door, for preventing said drive mechanism from opening said shutter unless said door assumes a fully closed posture; and a door locking mechanism, responsive to movement of said shutter, for preventing said door from opening unless said shutter assumes a fully closed posture.

2. A cartridge entry/exit station for a library apparatus as defined in claim 1, wherein said rack is provided with an erroneous insertion preventing guide structure having a guide surface to guide the cartridge, said guide structure being configured to come into general contact with an outer circumference of said cartridge when the cartridge is inserted in a normal condition, so that said guide surface establishes an inserted condition of the cartridge from said external space side toward said rack to control the erroneous insertion of the cartridge.

3. A cartridge entry/exit station for a library apparatus as defined in claim 1, wherein said rack is provided with an erroneous insertion preventing lever for establishing the insertion condition of the cartridge from said external space side toward said rack, said preventing lever being discharged by the cartridge along a tapered surface formed on a front end side of the cartridge when the cartridge is inserted in a normal insertion direction, said preventing lever being brought into contact with a front end surface of the cartridge when the cartridge is inserted in an erroneous insertion direction to control the erroneous insertion of the cartridge.

4. A cartridge entry/exit station for a library apparatus as defined in claim 1, wherein said door is provided with an erroneous insertion preventing projection for establishing the insertion condition of the cartridge from said external space side toward said rack, said preventing projection being inserted into a space formed by a chamfered portion of the cartridge at a closure of said door when the cartridge is inserted into said rack in a normal condition, and said preventing projection contacting the cartridge to inhibit the closure of said door when the cartridge is inserted in an erroneously inserted condition.

5. A cartridge entry/exit station for a library apparatus as defined in claim 1, wherein said rack is equipped with a positioning lever having a tip portion protruding toward an insertion space side of the cartridge and swinging within a plane perpendicular to an insertion direction of said cartridge, said positioning lever swinging upon insertion of the cartridge from said external space side such that said tip portion interacts with a positioning groove formed on a side portion of the cartridge thereby determining an insertion location of the cartridge at the time that said positioning groove reaches a position of said positioning lever.

6. A cartridge entry/exit station for a library apparatus as defined in claim 1, wherein the cartridge accommodates a magnetic tape as said storage medium and is equipped with a leader block for drawing out said magnetic tape in said processing section, and said door includes a contact portion which comes into contact with said leader block of the cartridge held on said rack in a state where said door is in a closed condition so that said leader block is pushed to the interior of the cartridge.

7. A cartridge entry/exit station for a library apparatus as defined in claim 6, wherein said contact portion is additionally provided with a positioning mechanism for fixing a location of said contact portion with respect to said leader block on the basis of a frame structure of said rack when said door is in a closed condition.

8. A cartridge entry/exit station for a library apparatus as defined in claim 1, further comprising a door closure detecting mechanism for detecting a closed condition of said door in link with a locking operation of said door into said door locking mechanism.

9. A cartridge entry/exit station for a library apparatus as defined in claim 1, further comprising a shutter unit including said shutter and a mechanical unit fitted to the inside of said shutter unit and having said drive mechanism, said rack and said door, said mechanical unit being provided to be detachable from said shutter unit.

10. A cartridge entry/exit station for a library apparatus as defined in claim 9, further comprising:
  a second shutter locking mechanism for inhibiting an opening operation of said shutter in a state where said mechanical unit is detached from said shutter unit and for allowing said shutter opening operation in a state of being attached thereto; and
  a mechanical unit locking mechanism for inhibiting a detaching operation of said mechanical unit from said shutter unit when said shutter is in an open condition and for allowing said mechanical unit detaching operation therefrom when being in a closed condition.

11. A library apparatus comprising:
  a storage unit for storing a plurality of storage cartridges, each cartridge accommodating a storage medium;
  a drive unit for performing a desired process on the storage medium in the individual cartridges;
  a transferring mechanism for transferring the individual cartridges in the library apparatus; and
  a cartridge entry/exit station for providing entry and exit of the individual cartridges, said cartridge entry/exit station having:
    means defining a communication space for communicating with both an internal operating space of said library apparatus, within which space the transferring mechanism operates, and an external space of said library apparatus, said communication space defining means having a rack for guiding insertion/discharge of one of the individual cartridges between the internal operating space and the external space and for storing the one cartridge;
  a door, movably mounted on said communication space defining means, for covering said rack from the external space;
  a shutter, movably mounted on said communication space defining means, for covering said rack from said internal operating space;
  a drive mechanism for driving said shutter into one of an opened posture and a closed posture;
  a shutter locking mechanism, responsive to movement of said door, for preventing said drive mechanism from opening said shutter unless said door assumes a fully closed posture; and
  a door locking mechanism, responsive to movement of said shutter, for preventing said door from opening unless said shutter assumes a fully closed posture.

* * * * *

UNITED STATES PATENT AND TRADEMARK OFFICE
CERTIFICATE OF CORRECTION

PATENT NO. : 6,088,189
DATED : July 11, 2000
INVENTOR(S) : Utsumi et al.

It is certified that error appears in the above-identified patent and that said Letters Patent is hereby corrected as shown below:

<u>Title page,</u>
After "[73] Assignee: Fujitsu Limited, Kawasaki, Japan" insert -- and Fujitsu Kiden Limited, Tokyo, Japan --.

Signed and Sealed this

Twenty-third Day of October, 2001

Attest:

NICHOLAS P. GODICI
Attesting Officer
Acting Director of the United States Patent and Trademark Office